US012627953B2

(12) United States Patent
Hwang et al.

(10) Patent No.: US 12,627,953 B2
(45) Date of Patent: May 12, 2026

(54) METHOD FOR TRANSMITTING FIRST MESSAGE BY FIRST DEVICE IN WIRELESS COMMUNICATION SYSTEM SUPPORTING SIDELINK, AND DEVICE THEREFOR

(71) Applicant: LG Electronics Inc., Seoul (KR)

(72) Inventors: Jaeho Hwang, Seoul (KR); Hakseong Kim, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 533 days.

(21) Appl. No.: 17/920,246

(22) PCT Filed: Apr. 26, 2021

(86) PCT No.: PCT/KR2021/005216
§ 371 (c)(1),
(2) Date: Oct. 20, 2022

(87) PCT Pub. No.: WO2021/221401
PCT Pub. Date: Nov. 4, 2021

(65) Prior Publication Data
US 2023/0247392 A1 Aug. 3, 2023

(30) Foreign Application Priority Data

Apr. 28, 2020 (KR) ........................ 10-2020-0051683

(51) Int. Cl.
*H04W 4/40* (2018.01)
*H04W 4/12* (2009.01)
*H04W 92/18* (2009.01)

(52) U.S. Cl.
CPC ............... *H04W 4/12* (2013.01); *H04W 4/40* (2018.02); *H04W 92/18* (2013.01)

(58) Field of Classification Search
None
See application file for complete search history.

(56) References Cited

U.S. PATENT DOCUMENTS

| | | | | |
|---|---|---|---|---|
| 10,506,394 | B2 | 12/2019 | Chun et al. | |
| 2017/0353883 | A1* | 12/2017 | Tenny ................... | H04W 28/06 |

(Continued)

FOREIGN PATENT DOCUMENTS

| | | |
|---|---|---|
| CN | 106488584 | 3/2017 |
| EP | 3618391 | 3/2020 |

(Continued)

OTHER PUBLICATIONS

International Search Report in International Appln. No. PCT/KR2021/005216, dated Aug. 2, 2021, 6 pages (with English translation).

(Continued)

*Primary Examiner* — Benjamin Lamont
(74) *Attorney, Agent, or Firm* — Fish & Richardson P.C.

(57) ABSTRACT

According to various embodiments, disclosed are a method for transmitting a first message by a first device in a wireless communication system supporting sidelink, and a device therefor. Disclosed are the method and the device for same, the method comprising the steps of: receiving a first request message for requesting transmission of the first message on the basis of a bypass interface; transmitting a response message for acknowledging transmission of the first message; and transmitting a second message, which has been received from the network, as the first message on the basis of the bypass interface, wherein the bypass interface is an interface for transmitting the second message, which has been received through a first interface, as the first message through a second interface without involvement of an application layer of the first device, and the response message includes channel information related to the second interface.

9 Claims, 23 Drawing Sheets

(56)                    References Cited

U.S. PATENT DOCUMENTS

| | | | | |
|---|---|---|---|---|
| 2018/0167790 A1* | 6/2018 | Cavalcanti | .............. | H04W 4/44 |
| 2018/0184270 A1* | 6/2018 | Chun | ..................... | H04W 8/22 |
| 2020/0021355 A1* | 1/2020 | Pinheiro | .............. | H04W 48/20 |
| 2020/0120466 A1* | 4/2020 | Rajagopal | ............. | H04L 5/0096 |
| 2020/0170075 A1* | 5/2020 | Xu | ........................ | H04B 7/2606 |
| 2020/0296187 A1* | 9/2020 | Sabella | ................... | H04L 67/12 |
| 2022/0369164 A1* | 11/2022 | Hu | ........................ | H04W 40/22 |

FOREIGN PATENT DOCUMENTS

| | | |
|---|---|---|
| KR | 10-2019-0034094 A | 4/2019 |
| WO | WO 2019/109005 | 6/2019 |

OTHER PUBLICATIONS

Hossain et al., "Vehicular telematics over heterogeneous wireless networks: A survey," Computer Communications, May 2010, 33(7):775-793.
Action in Korean Appln. No. 10-2022-7040152, mailed on Jul. 16, 2025, 18 pages (with English translation).

* cited by examiner

PU5-U (a)

PU5-U (b)

BS (e.g. eNB or gNB)

UE1                                      UE2

C-V@X (LTE-V2X) in EU

C-V@X (LTE-V2X) in US

Figure 22:
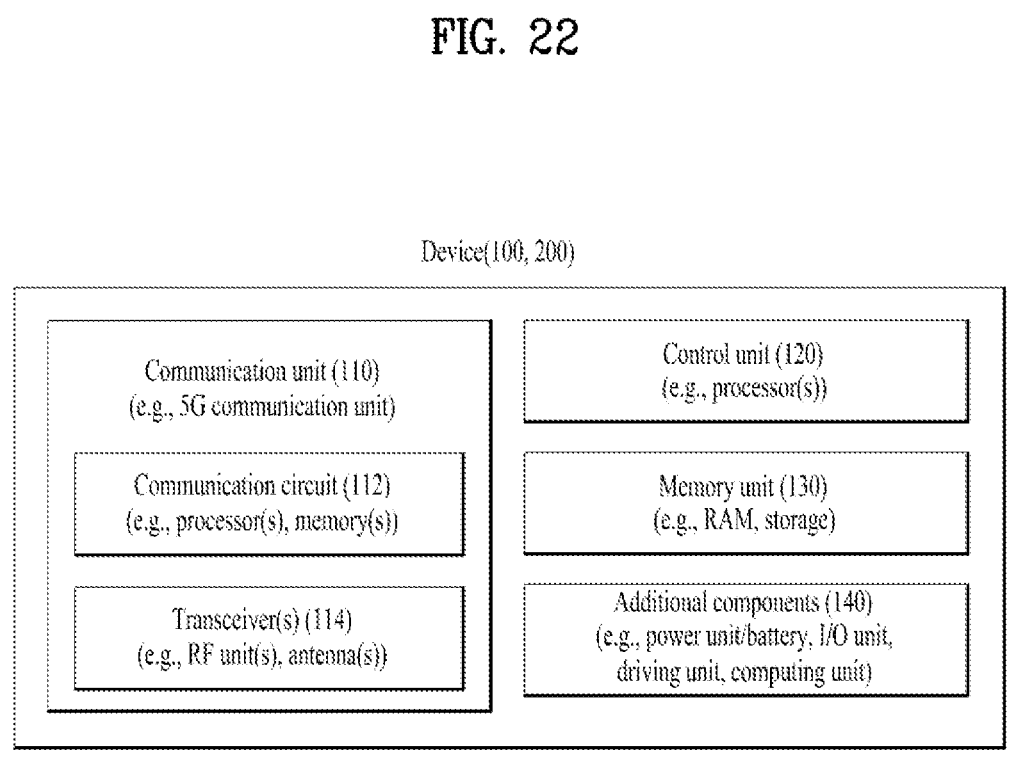

Device(100, 200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

METHOD FOR TRANSMITTING FIRST MESSAGE BY FIRST DEVICE IN WIRELESS COMMUNICATION SYSTEM SUPPORTING SIDELINK, AND DEVICE THEREFOR

CROSS-REFERENCE TO RELATED APPLICATIONS

This application is a National Stage application under 35 U.S.C. § 371 of International Application No. PCT/KR2021/005216, filed Apr. 26, 2021, which claims the benefit of Korean Application No. 10-2020-0051683, filed on Apr. 28, 2020. The disclosures of the prior applications are incorporated by reference in their entirety.

TECHNICAL FIELD

Embodiments of the present disclosure relate to a method for allowing a first device to transmit a first message based on a bypass interface in a wireless communication system supporting sidelink, and a device for the same.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between UEs without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

An object of the present disclosure is to provide a method for easily converting an external message received from a Uu interface into a message of a V2X interface and transmitting the resultant message using a bypass interface without involvement of an application layer which analyzes the external message and extracts data from the external message, and a device for the same.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solutions

In accordance with one aspect of the present disclosure, a method for transmitting a first message by a first device in a wireless communication system supporting sidelink may include receiving a first request message for requesting transmission of the first message based on a bypass interface; transmitting a response message for acknowledging transmission of the first message; and transmitting a second message received from a network as a first message of the second interface based on the bypass interface, wherein the bypass interface is an interface for transmitting the second message received through the first interface as the first message of the second interface without involvement of an application layer of the first device, and the response message includes channel information related to the second interface.

The channel information may include at least one of a subchannel index for a channel related to the second interface, a channel busy ratio (CBR), channel quality information, a resource pool, service information, and a configuration parameter related to the first device.

The second message may further include information about at least one transmission parameter related to the second interface determined based on the channel information, wherein the first device is configured to transmit the first message based on the at least one transmission parameter.

The second message may include the first message preconfigured as a message type of the second interface.

The first device may be configured to extract the first message by removing a first header related to the bypass interface from the second message, and transmit the extracted first message through the second interface.

The first message may be transmitted as a message type of any one of a cooperative awareness message (CAM), a vulnerable road user awareness message (VAM), a collective perception message (CPM), a decentralized environmental notification message (DENM), a basic safety message (BSM), a pedestrian safety message (PSM), a maneuver coordination message (MCM), a road safety message (RSM), a signal phase & timing message (SPAT), and a map data (MAP), which are associated with the second interface based on type information included in the first header.

The first message may include information about a generation time corresponding to a generation time of the second message in the network.

The first device may be configured to receive a second request message for requesting transmission of a third message of the second interface as a fourth message of the first interface based on the bypass interface.

The first interface may be an interface for wired or wireless communication with the network, and the second interface may be a PC5 interface or a direct communication interface related to dedicated short-range communication (DSRC).

In accordance with another aspect of the present disclosure, a method for requesting transmission of a first message from a first device by a network in a wireless communication system supporting sidelink may include transmitting a request message for requesting transmission of the first message based on a bypass interface; receiving a response message including channel information related to a second interface; and transmitting a second message generated in response to the bypass interface to the first device through the first interface, wherein the second message includes a message that is comprised of not only at least one transmission parameter for the second interface determined based on the channel information in response to the bypass interface, but also a message type of the second interface.

In accordance with another aspect of the present disclosure, a first device for transmitting a first message in a wireless communication system supporting sidelink may include a radio frequency (RF) transceiver; and a processor connected to the RF transceiver, wherein the processor is configured to: receive a first request message for requesting transmission of the first message based on a bypass interface, under control of the RF transceiver; transmit a response message for acknowledging transmission of the first message; and transmit a second message received from a network as the first device based on the bypass interface. The bypass interface may be an interface for transmitting the second message received through the first interface as the first message through the second interface without involvement of an application layer of the first device, and the response message may include channel information related to the second interface.

In accordance with another aspect of the present disclosure, a network for requesting transmission of a first message from a first device in a wireless communication system supporting sidelink may include a radio frequency (RF) transceiver; and a processor connected to the RF transceiver, wherein the processor is configured to: transmit a request message for requesting transmission of a first message based on a bypass interface to the first device through a first interface, under control of the RF transceiver; receive a response message including channel information related to a second interface; and transmit a second message generated in response to the bypass interface to the first device through the first interface. The second message includes a message that is comprised of not only at least one transmission parameter for the second interface determined based on the channel information in response to the bypass interface, but also a message type of the second interface.

In accordance with another aspect of the present disclosure, a chipset related to a first device for transmitting a first message in a wireless communication system supporting sidelink may include at least one processor; and at least one memory operatively connected to the at least one processor, and configured to store instructions such that the at least one processor performs specific operations by executing the instructions, wherein the specific operations include: receiving a first request message for requesting transmission of the first message based on a bypass interface; transmitting a response message for acknowledging transmission of the first message; and transmitting a second message received from a network as a first message based on the bypass interface. The bypass interface may be an interface for transmitting the second message received through the first interface as the first message without involvement of an application layer of the first device, and the response message may include channel information related to the second interface.

The processor may be configured to generate a control signal related to autonomous driving of the first device electrically connected to the chipset based on the second message.

In accordance with another aspect of the present disclosure, a computer-readable storage medium configured to store at least one computer program including instructions used to transmit a first message in a wireless communication system supporting sidelink, the computer-readable storage medium may include at least one computer program for allowing the at least one processor to perform specific operations of transmitting the first message; and a computer-readable storage medium configured to store the at least one computer program. The specific operations include: receiving a first request message for requesting transmission of the first message based on a bypass interface; transmitting a response message for acknowledging transmission of the first message; and transmitting a second message received from a network as a first message based on the bypass interface. The bypass interface may be an interface for transmitting the second message received through the first interface as the first message through the second interface, without involvement of an application layer of the first device, and the response message may include channel information related to the second interface.

Advantageous Effects

Various embodiments of the present disclosure can easily convert an external message received from a Uu interface into a message of a V2X interface and can transmit the resultant message using a bypass interface without involvement of an application layer which analyzes the external message and extracts data from the external message.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

FIGS. 15 and 16 are flowcharts illustrating examples of a method for allowing the RSU to transmit messages using the Aux interface.

FIG. 22 illustrates another example of a wireless device to which the present disclosure is applied.

BEST MODE

Figure 1:
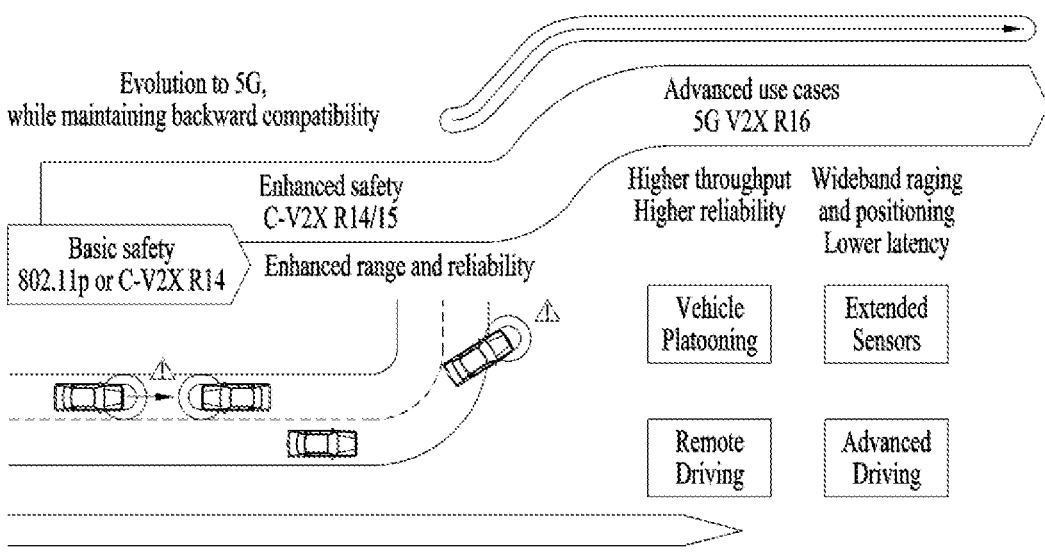
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
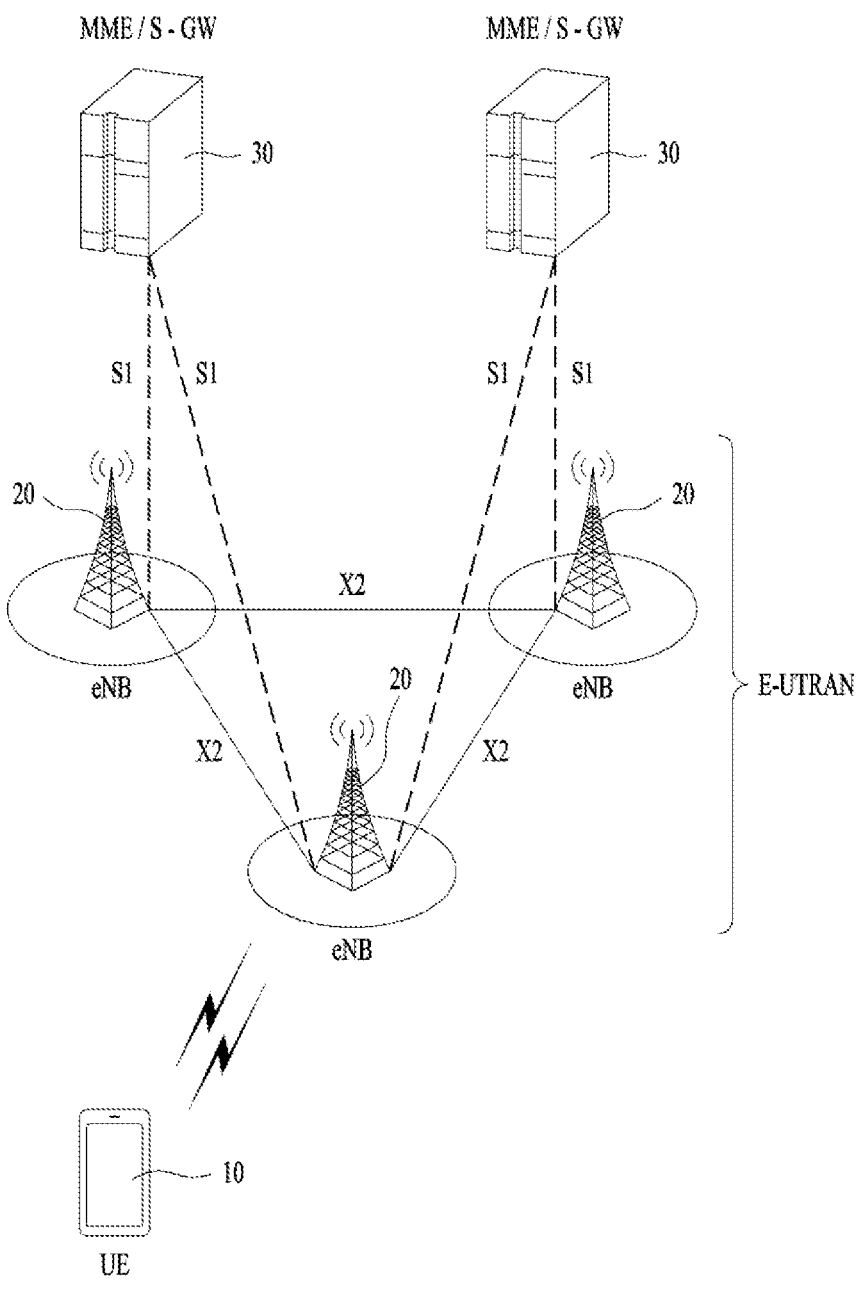
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user UE (UT), subscriber station (SS), mobile UE (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
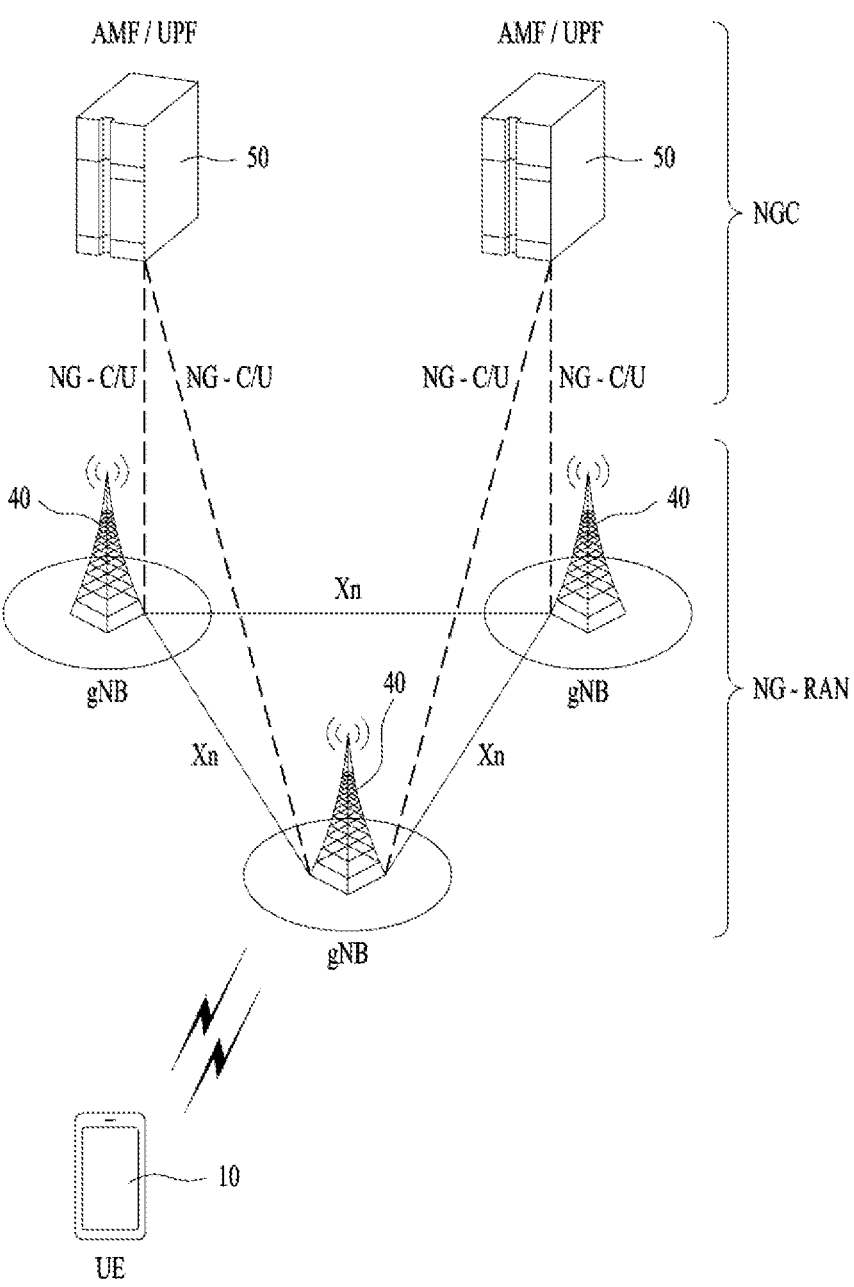
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
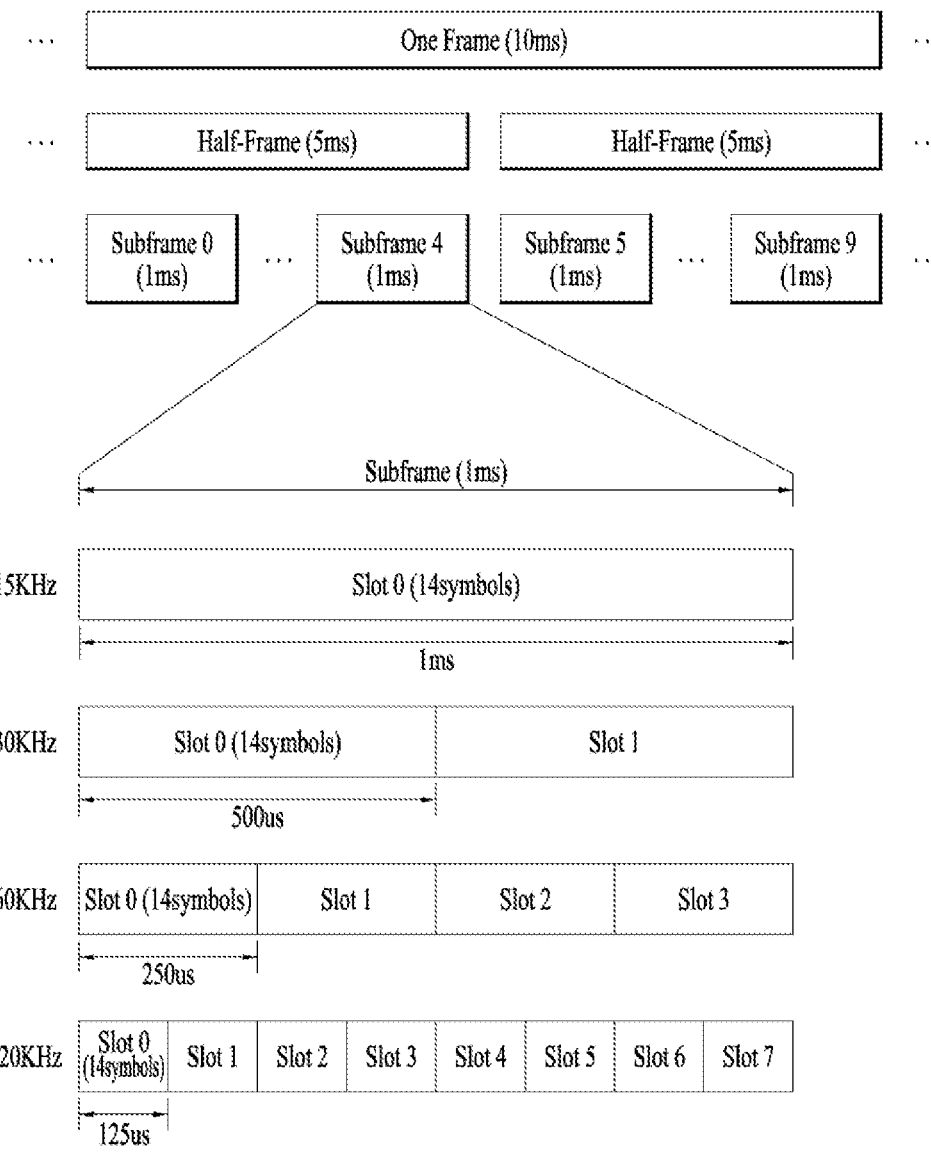
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration $\mu$ in the NCP case.

TABLE 1

| SCS (15 * 2u) | $N^{slot}_{symb}$ | $N^{frame,\mu}_{slot}$ | $N^{subframe,\mu}_{slot}$ |
|---|---|---|---|
| 15 KHz (u = 0) | 14 | 10 | 1 |
| 30 KHz (u = l) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,\mu}_{slot}$ | $N^{subframe,\mu}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 5:
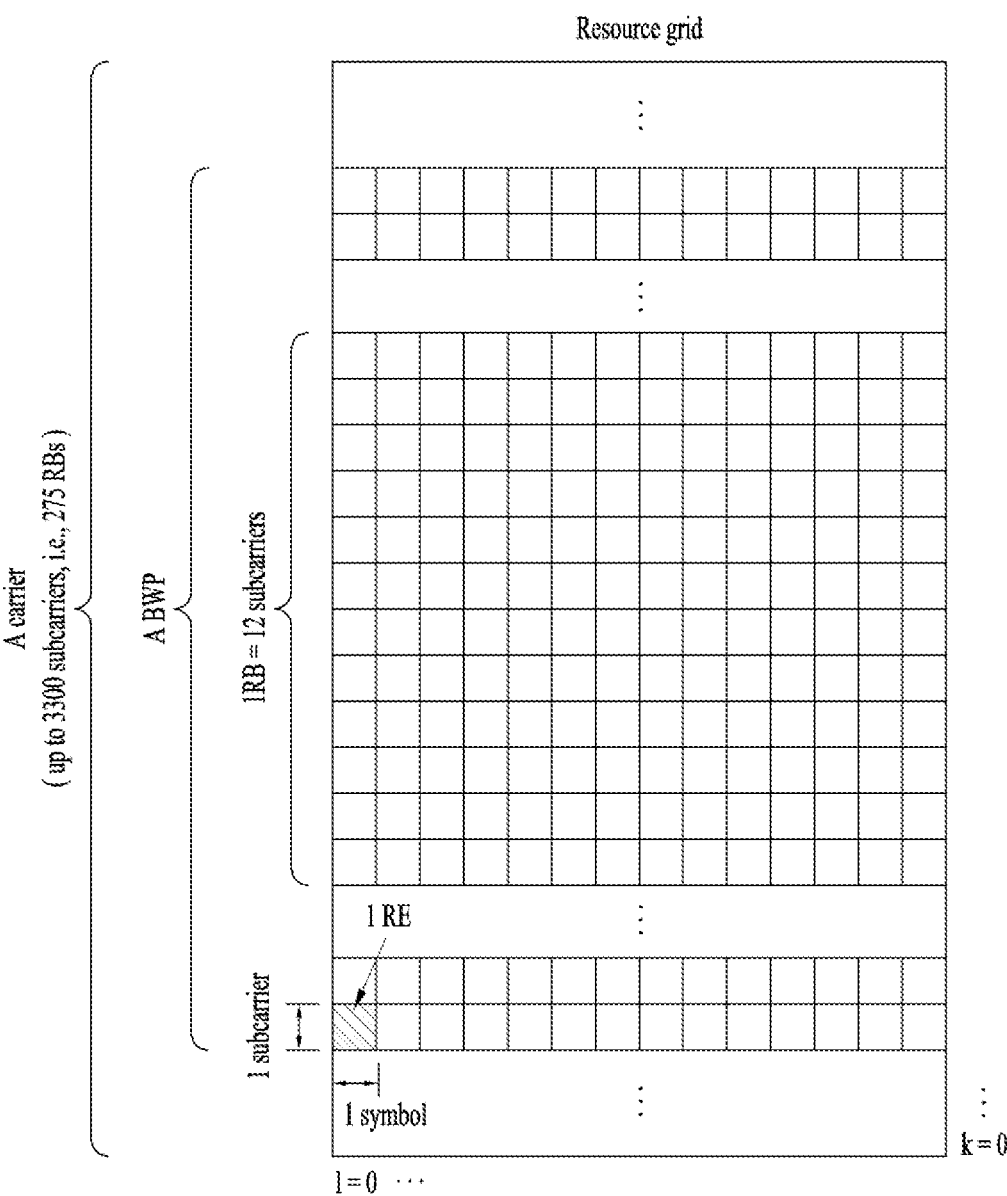
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
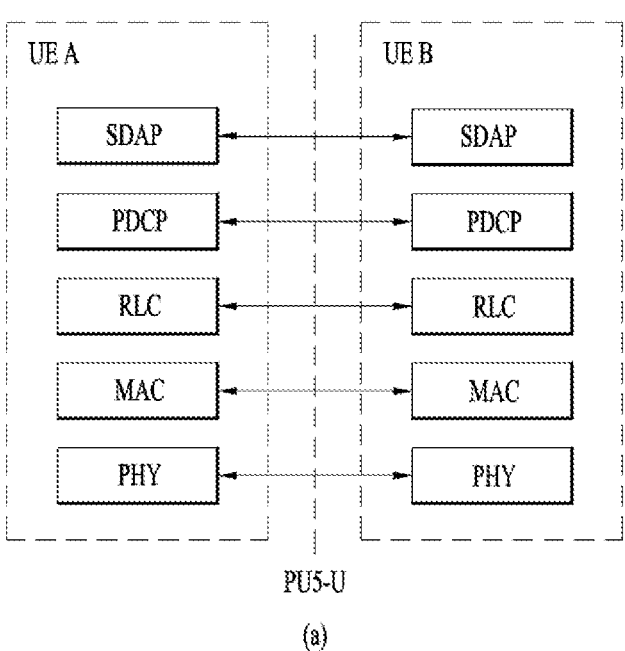
FIG. 6 illustrates a radio protocol architecture for SL communication.
Figure 6:
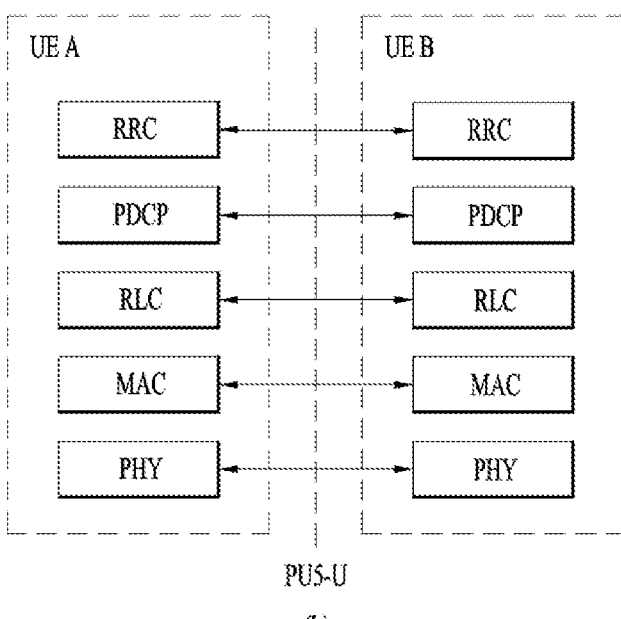

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
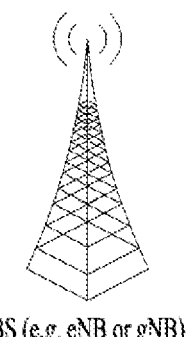
FIG. 7 illustrates UEs performing V2X or SL communication.
Figure 7:
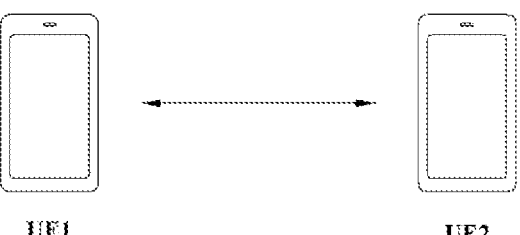

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
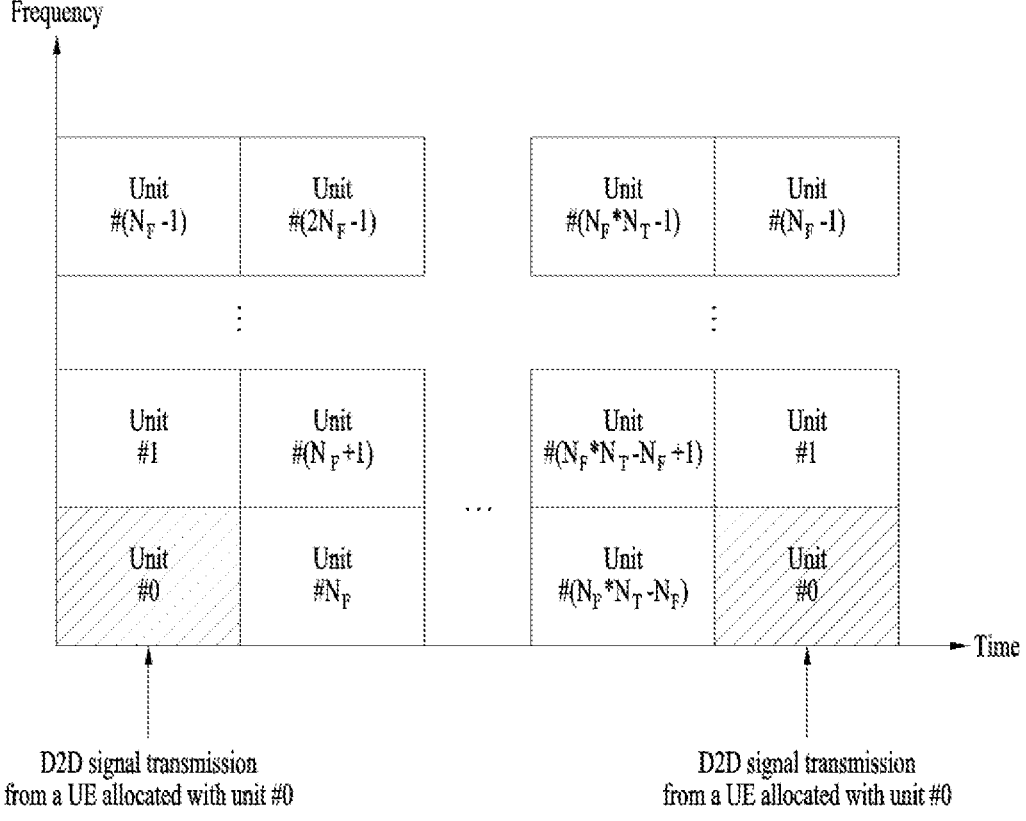
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Vehicular Communications for ITS

An intelligent transport system (ITS) utilizing vehicle-to-everything (V2X) may mainly include an access layer, a network & transport layer, a facilities layer, an application layer, security and management entities, etc. Vehicle communication may be applied to various scenarios such as vehicle-to-vehicle communication (V2V), vehicle-to-network communication (V2N or N2V), vehicle-to-road side unit (RSU) communication (V2I or I2V), RSU-to-RSU communication (I2I), vehicle-to-pedestrian communication (V2P or P2V), and RSU-to-pedestrian communication (I2P or P2I). A vehicle, a BS, an RSU, a pedestrian, etc. as the subjects of vehicle communication are referred to as ITS stations.

Figure 9:
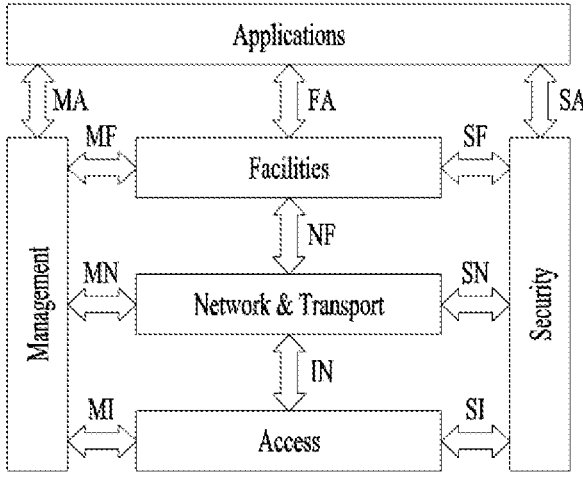
FIG. 9 is a diagram for explaining an ITS station reference architecture.

FIG. 9 is a diagram for explaining an ITS station reference architecture.

The ITS station reference architecture may include an access layer, a network & transport layer, a facilities layer, entities for security and management, and an application layer at the top. Basically, the ITS station reference architecture follows a layered OSI model.

Specifically, features of the ITS station reference architecture based on the OSI model are illustrated in FIG. 9. The access layer of the ITS station corresponds to OSI layer 1 (physical layer) and layer 2 (data link layer), the network & transport layer of the ITS station corresponds to OSI layer 3 (network layer) and layer 4 (transport layer), and the facilities layer of the ITS station corresponds to OSI layer 5 (session layer), layer 6 (presentation layer), and layer 7 (application layer).

The application layer, which is located at the highest layer of the ITS station, may actually implement and support a use-case and may be selectively used according to the use-case. The management entity serves to manage all layers in addition to managing communication and operations of the ITS station. The security entity provides security services for all layers. Each layer of the ITS station exchanges data transmitted or received through vehicle communication and additional information for various purposes through an interface. The abbreviations of various interfaces are described below.

MA: Interface between management entity and application layer

MF: Interface between management entity and facilities layer

MN: Interface between management entity and networking & transport layer

MI: Interface between management entity and access layer

FA: Interface between facilities layer and ITS-S applications

NF: Interface between networking & transport layer and facilities layer

IN: Interface between access layer and networking & transport layer

SA: Interface between security entity and ITS-S applications

SF: Interface between security entity and facilities layer

SN: Interface between security entity and networking & transport layer

SI: Interface between security entity and access layer

Figure 10:
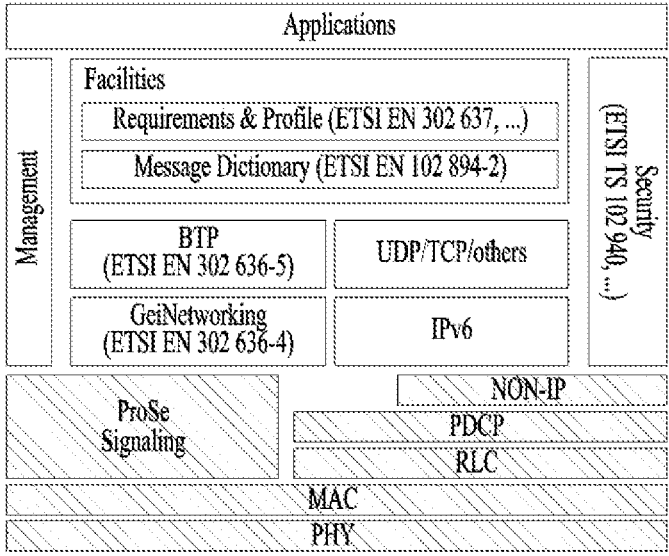
FIG. 10 illustrates an exemplary structure of an ITS station that may be designed and applied based on a reference architecture.
Figure 10:
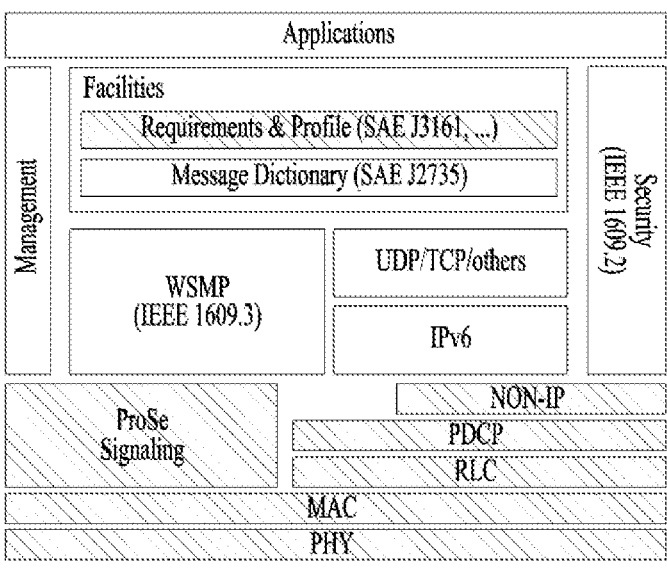

FIG. 10 illustrates an exemplary structure of an ITS station that may be designed and applied based on a reference architecture.

A main concept of the ITS station reference architecture is to allow each layer with a special function to process communication on a layer basis, between two end vehicles/users included in a communication network. That is, when a V2V message is generated, the data is passed through each layer downwards layer by layer in the vehicle and the ITS system (or other ITS-related UEs/systems), and a vehicle or ITS system (or other ITS-related UEs/systems) receiving the message passes the message upwards layer by layer.

The ITS system operating through vehicle communication and the network was organically designed in consideration of various access technologies, network protocols, communication interfaces, etc. to support various use-cases, and the roles and functions of each layer described below may be changed depending on a situation. The main functions of each layer will be briefly described.

The application later actually implements and supports various use-cases. For example, the application layer provides security, efficient traffic information, and other entertainment information.

The application layer controls an ITS station to which an application belongs in various manners or provides services by transferring a service message to an end vehicle/user/infrastructure through the access layer, the network & transport layer, and the facilities layer, which are lower layers of the application layer, by vehicle communication. In this case, the ITS application may support various use-cases. In general, these use-cases may be supported by grouping into other applications such as road-safety, traffic efficiency, local services, and infotainment. Application classification, use-cases, etc. may be updated when a new application scenario is defined. Layer management serves to manage and service information related to operation and security of the application layer, and the related information is transmitted and shared bidirectionally through an MA and an SA (or service access point (SAP), e.g. MA-SAP or SA-SAP). A request from the application layer to the facilities layer or a service message and related information from the facilities layer to the application layer may be delivered through an FA.

The facilities layer serves to support effective implementation of various use-cases defined in an application layer of a higher layer. For example, the facilities layer may perform application support, information support, and session/communication support.

The facilities layer basically supports the 3 higher layers of the OSI model, for example, a session layer, a presentation layer, and the application layer, and functions. Specifically, the facilities layer provides facilities such as application support, information support, and session/communication support, for the ITS. Here, the facilities mean components that provide functionality, information, and data.

The application support facilities support the operation of ITS applications (mainly generation of a message for the ITS, transmission and reception of the message to and from a lower layer, and management of the message). The application support facilities include a cooperative awareness (CA) basic service and a decentralized environmental notification (DEN) basic service. In the future, facilities entities for new services such as cooperative adaptive cruise control (CACC), platooning, a vulnerable roadside user (VRU), and a collective perception service (CPS), and related messages may be additionally defined.

The information support facilities provide common data information or a database to be used by various ITS applications and includes a local dynamic map (LDM).

The session/communication support facilities provide services for communications and session management and include an addressing mode and session support.

Facilities may be divided into common facilities and domain facilities.

The common facilities are facilities that provide common services or functions required for various ITS applications and ITS station operations, such as time management, position management, and service management.

The domain facilities are facilities that provide special services or functions required only for some (one or more) ITS applications, such as a DEN basic service for road hazard warning applications (RHW). The domain facilities are optional functions and are not used unless supported by the ITS station.

Layer management serves to manage and service information related to the operation and security of the facilities layer, and the related information is transmitted and shared bidirectionally through an MF and an SF (or MF-SAP and SF-SAP). The transfer of service messages and related information from the application layer to the facilities layer or from the facilities layer to the application layer is performed through an FA (or FA-SAP), and bidirectional service messages and related information between the facilities layer and the lower networking & transport layer are transmitted by an NF (or NF-SAP).

The network & transport layer servers to configure a network for vehicle communication between homogenous or heterogeneous networks through support of various transport protocols and network protocols. For example, the network & transport layer may provide Internet access, routing, and vehicle networking using Internet protocols such as TCP/UDP+IPv6 and form a vehicle network using a basic transport protocol (BTP) and GeoNetworking-based protocols. In this case, networking using geographic position information may also be supported. A vehicle network layer may be designed or configured depending on technology used for the access layer (access layer technology-independently) or regardless of the technology used for the access layer (access layer technology-independently or access layer technology agnostically).

Functionalities of the European ITS network & transport layer are as follows. Basically, functionalities of the ITS network & transport layer are similar to or identical to those of OSI layer 3 (network layer) and layer 4 (transport layer) and have the following characteristics.

Figure 11:
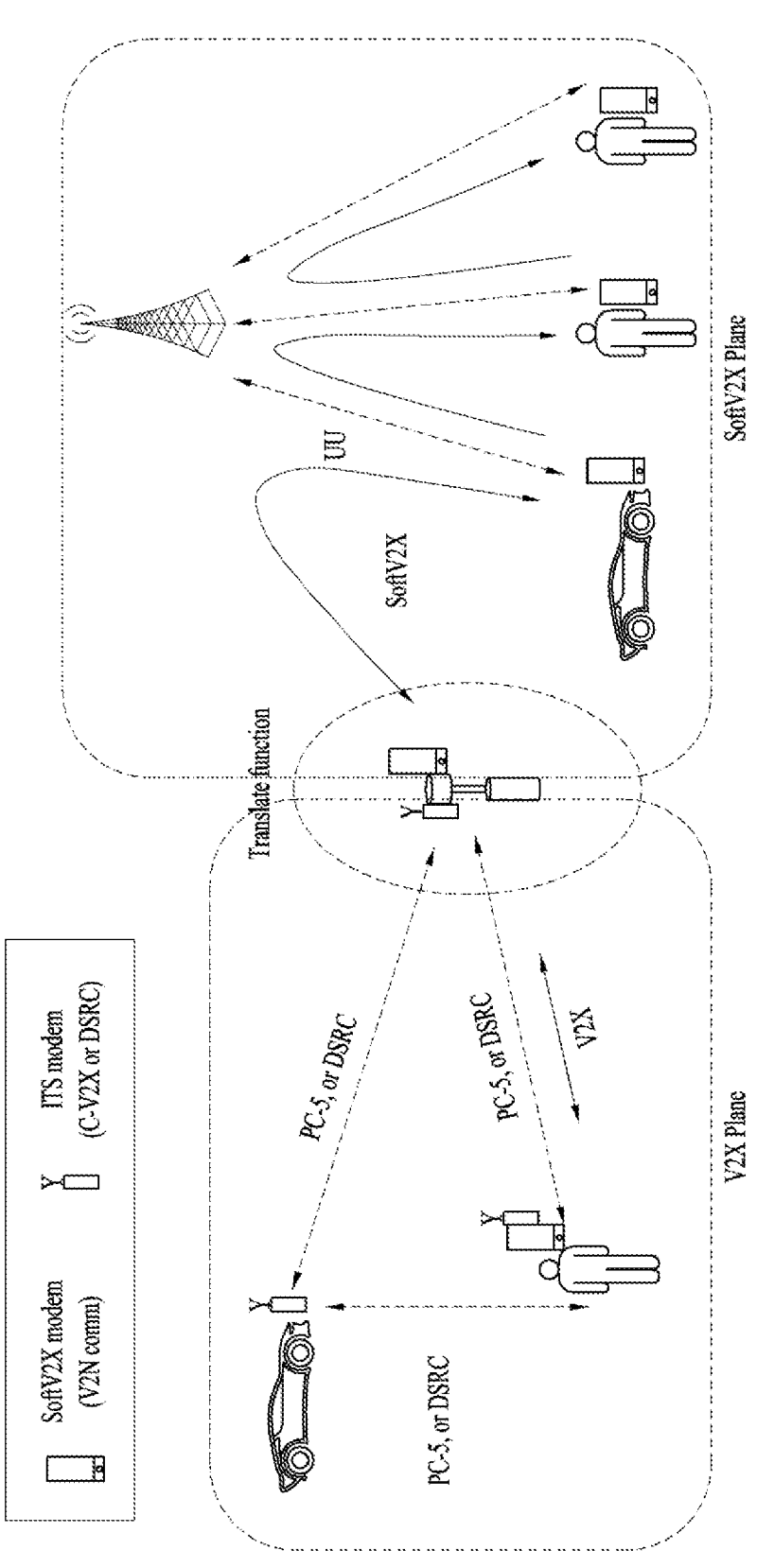
FIGS. 11 and 12 are diagrams illustrating examples of a connection between a V2X system and a SoftV2X system.

The transport layer is a connection layer that delivers service messages and related information received from higher layers (the session layer, the presentation layer, and the application layer) and lower layers (the network layer, the data link layer, and the physical layer). The transport layer serves to manage data transmitted by an application of the ITS station so that the data accurately arrives at an application process of the ITS station as a destination. Transport protocols that may be considered in European ITS include, for example, TCP and UDP used as legacy Internet protocols as illustrated in FIG. 11, and there are transport protocols only for the ITS, such as the BTS.

The network layer serves to determine a logical address and a packet forwarding method/path, and add information such as the logical address of a destination and the forwarding path/method to a header of the network layer in a packet received from the transport layer. As an example of the packet method, unicast, broadcast, and multicast between ITS stations may be considered. Various networking protocols for the ITS may be considered, such as GeoNetworking, IPv6 networking with mobility support, and IPv6 over GeoNetworking. In addition to simple packet transmission, the GeoNetworking protocol may apply various forwarding paths or transmission ranges, such as forwarding using position information about stations including vehicles or forwarding using the number of forwarding hops.

Layer management related to the network & transport layer serves to manage and provide information related to the operation and security of the network & transport layer, and the related information is transmitted and shared bidirectionally through an MN (or MN-SAP) and an SN (or SN-SAP). Transmission of bidirectional service messages and related information between the facilities layer and the networking & transport layer is performed by an NF (or NF-SAP), and service messages and related information between the networking & transport layer and the access layer are exchanged by an IN (or IN-SAP).

A North American ITS network & transport layer supports IPv6 and TCP/UDP to support existing IP data like Europe, and a wave short message protocol (WSMP) is defined as a protocol only for the ITS.

A packet structure of a wave short message (WSM) generated according to the WSMP includes a WSMP header and WSM data carrying a message. The WSMP header includes Version, PSID, WSMP header extension fields, WSM WAVE element ID, and Length.

Version is defined by a WsmpVersion field indicating an actual WSMP version of 4 bits and a reserved field of 4 bits. PSID is a provider service identifier, which is allocated according to an application in a higher layer and helps a receiver to determine an appropriate higher layer. Extension fields is a field for extending the WSMP header, and includes information such as a channel number, a data rate, and transmit power used. WSMP WAVE element ID specifies the type of a WSM to be transmitted. Length specifies the length of transmitted WSM data in octets through a WSMLength field of 12 bits, and the remaining 4 bits are reserved. LLC Header allows IP data and WSMP data to be transmitted separately and is distinguished by Ethertype of a SNAP. The structures of the LLC header and the SNAP header are defined in IEEE802.2. When IP data is transmitted, Ethertype is set to 0x86DD in the LLC header. When WSMP is transmitted, Ethertype is set to 0x88DC in the LLC header. The receiver identifies Ethertype. If Ethertype is 0x86DD, the receiver transmits upward the packet to an IP data path, and if Ethertype is 0x88DC, the receiver transmits upward the packet to a WSMP path.

The access layer serves to transmit a message or data received from a higher layer on a physical channel. As access layer technologies, ITS-G5 vehicle communication technology based on IEEE 802.11p, satellite/broadband wireless mobile communication technology, 2G/3G/4G (long-term evolution (LTE), etc.)/5G wireless cellular communication technology, cellular-V2X vehicle-dedicated communication technologies such as LTE-V2X and NR-V2X (new radio), broadband terrestrial digital broadcasting technology such as DVB-T/T2/ATSC3.0, and GPS technology may be applied.

A data link layer is a layer that converts a physical line between adjacent nodes (or between vehicles) with noise into a communication channel without transmission error, for use in the higher network layer. The data link layer performs a function of transmitting/delivering/forwarding L3 protocols, a framing function of dividing data to be transmitted into packets (or frames) as transmission units and grouping the packets, a flow control function of compensating for a speed difference between a transmitter and a receiver, and a function of (because there is a high probability that an error and noise occurs randomly in view of the nature of a physical transmission medium) detecting a transmission error and correcting the error or detecting a transmission error based on a timer and an ACK signal by a transmitter in a method such as automatic repeat request (ACK) and retransmitting a packet that has not been correctly received. In addition, to avoid confusion between packets or ACK signals, the data link layer performs a function of assigning a sequence number to the packets and the ACK signals, and a function of controlling establishment, maintenance, and disconnection of a data link between network entities, and data transmission between network entities. The main functions of logical link control (LLC), radio resource control (RRC), packet data convergence protocol (PDCP), radio link control (RLC), medium access control (MAC), and multi-channel operation (MCO) included in the data link layer of FIG. 11 will be described below.

An LLC sub-layer enables the use of different lower MAC sub-layer protocols, and thus enables communication regardless of network topology. An RRC sub-layer performs functions such as broadcasting of cell system information required for all UEs within a cell, management of delivery of paging messages, management (setup/maintenance/release) of RRC connection between a UE and an E-UTRAN, mobility management (handover), transmission of UE context between eNodeBs during handover, UE measurement reporting and control therefor, UE capability management, temporary assignment of a cell ID to a UE, security management including key management, and RRC message encryption. A PDCP sub-layer may performs functions such as IP packet header compression in a compression method such as robust header compression (ROHC), cyphering of a control message and user data, data integrity, and data loss prevention during handover. RLC sub-layer delivers a packet received from the higher PDCP layer in an allowed size of the MAC layer through packet segmentation/concatenation, increases data transmission reliability by transmission error and retransmission management, checks the order of received data, reorders data, and checks redundancy. A MAC sub-layer performs functions such as control of the occurrence of collision/contention between nodes for use of shared media among multiple nodes, matching a packet delivered from the higher layer to a physical layer frame format, assignment and identification of the address of the transmitter/receiver, detection of a carrier, collision detection, and detection of obstacles on the physical medium. An MCO sub-layer enables efficient provision of various services on a plurality of frequency channels. The main function of MCO sub-layer is to effectively distribute traffic load of a specific frequency channel to other channels to minimize collision/contention of communication information between vehicles in each frequency channel.

The physical layer is the lowest layer in the ITS layer architecture. The physical layer defines an interface between a node and a transmission medium and performs modulation, coding, and mapping of a transport channel to a physical channel, for bit transmission between data link layer entities and informs the MAC sub-layer of whether a wireless medium is busy or idle by carrier sensing or clear channel assessment (CCA).

A SoftV2X system may be a system in which a SoftV2X server receives a VRU message or a personal safety message (PSM) from a vulnerable road user (VRU) or a V2X vehicle and transfers information on a neighbor VRU or vehicle based on the VRU message or the PSM message or may analyze a road condition, etc. on which neighbor VRUs or vehicles move and may transmit a message informing a neighbor VRU or vehicle of a collision warning, etc. based on the analyzed information (e.g., through a downlink signal) via V2X communication using a UU interface. Here, the VRU message may be a message transmitted to the SoftV2X server through the UU interface, and may include mobility information about the VRU, such as a position, a movement direction, a movement path, and a speed of the VRU. That is, the SoftV2X system may use a method of receiving mobility information of VRUs and/or vehicles related to V2X communication through the UU interface and controlling a driving route or a VRU movement flow of the VRU, etc. based on the mobility information received by the softV2X server, such as a network. The SoftV2X system may be configured in relation to V2N communication.

User equipment or pedestrian equipment (VRU device) that is difficult to perform direct communication (PC5, DSRC) related to V2X communication can provide or receive driving information and mobility information to nearby vehicles or VRUs through the SoftV2X system based on the UU interface. Through this, the user equipment or pedestrian equipment (VRU device) that is difficult to perform the direct communication (PC5, DSRC) can be protected from surrounding vehicles.

Facility Aux for Connection with External V2N Service

On the other hand, when infrastructure related to the ITS system is constructed, the vehicle and/or the RSU may be provided with vehicle/pedestrian protection services through the Uu interface. However, interconnection between the V2N-based service and the ITS-based service is not easy, and field-to-field connection between the above-described services may be required for such easy interconnection.

Hereinafter, methods and schemes for easily interconnecting the above two services will be described in detail. On the other hand, the ITS system is a system in which signals are transmitted and received based on direct communication (PC5, DSRC), and is defined as corresponding to the V2X system for convenience of description. The V2N system refers to a system for transmitting and receiving signals to and from a network through the Uu interface and the like, and is defined as corresponding to the SoftV2X system.

Figure 12:
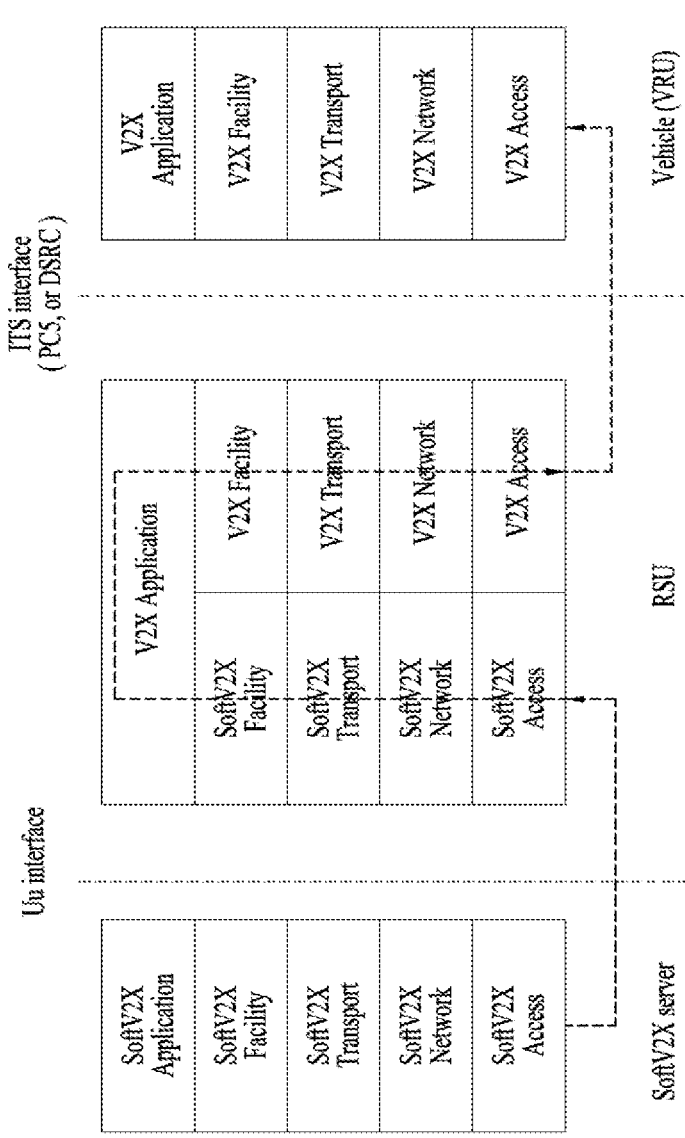

FIGS. 11 and 12 are diagrams illustrating examples of a connection between the V2X system and the SoftV2X system.

Referring to FIG. 11, the RSU may include both a V2X modem (or an ITS modem) and a SoftV2X modem (or a V2X modem), and may relay information between the V2X system and the SoftV2X system.

The V2X system (or ITS system) may provide an ITS safety service based on governmental regulations. The RSU may provide the ITS safety service by performing direct communication with a peripheral vehicle, a VRU, and/or other RSUs through the V2X modem (or ITS modem). As described above, communication related to the ITS safety service may include DSRC communication based on 802.11P and V2X (or C-V2X) communication using PC5 of LTE or NR. On the other hand, SoftV2X-related communication (provided through V2N) is a communication scheme for exchanging location and state information between the VRU and the vehicles through applications (apps) installed in a smartphone, and providing safety and convenience services between the VRU and the vehicles based on the exchanged location and state information.

In general, the RSU may share safety information between a V2X device (or an ITS station) and V2X vehicles through a V2X modem or a V2X interface (e.g., DSRC and/or C-V2X (PC-5 interface)). Alternatively, in order to transmit SoftV2X information acquire through the Uu interface or the SoftV2X modem (or V2N modem) to the ITS station, the RSU must extract safety-related information from the SoftV2X information, must generate a message formed in a format suitable for the V2X system (or the ITS system), and must transmit the generated message to other V2X vehicles (or ITS vehicles) through the V2X module.

FIG. 12 is a diagram illustrating a system communication stack structure in the RSU for use in the two systems. In order to transmit the SoftV2X-related message as a message of the V2X communication (or ITS communication), the RSU may convert data extracted from the SoftV2X-related message into CAM, VAM or DENM messages suitable for V2X communication (or ITS communication), and may transmit the converted messages through the V2X protocol stack.

As described above, when it is necessary to exchange information between the two systems, the RSU has to include software that is required for performing conversion between messages of the two systems and then analyzing each of the messages of the two systems. Specifically, the RSU should include software that can analyze each of the SoftV2X message (or V2N message) and the V2X message (or ITS message), and may greatly increase processing power consumption caused by both an operation for performing decoding using the SoftV2X message (or V2N message) and an operation for performing encoding using the ITS message.

In order to address the above issues, an interface capable of simplifying the operation for converting messages between the two systems needs to be newly defined. Specifically, the RSU may further include an Aux block (or a bypass block) capable of converting (or translating) messages between the two systems. The Aux block may be added to the facility layer. The RSU may perform a function of directly transferring a message (or SoftV2X message) generated or received externally through the Aux block to another interface (V2X interface). The Aux block may additionally provide an interface capable of easily converting messages between two systems without involvement of the application layer of the RSU. Here, the function by the Aux block may be defined as an Aux function which means external input.

Figure 13:
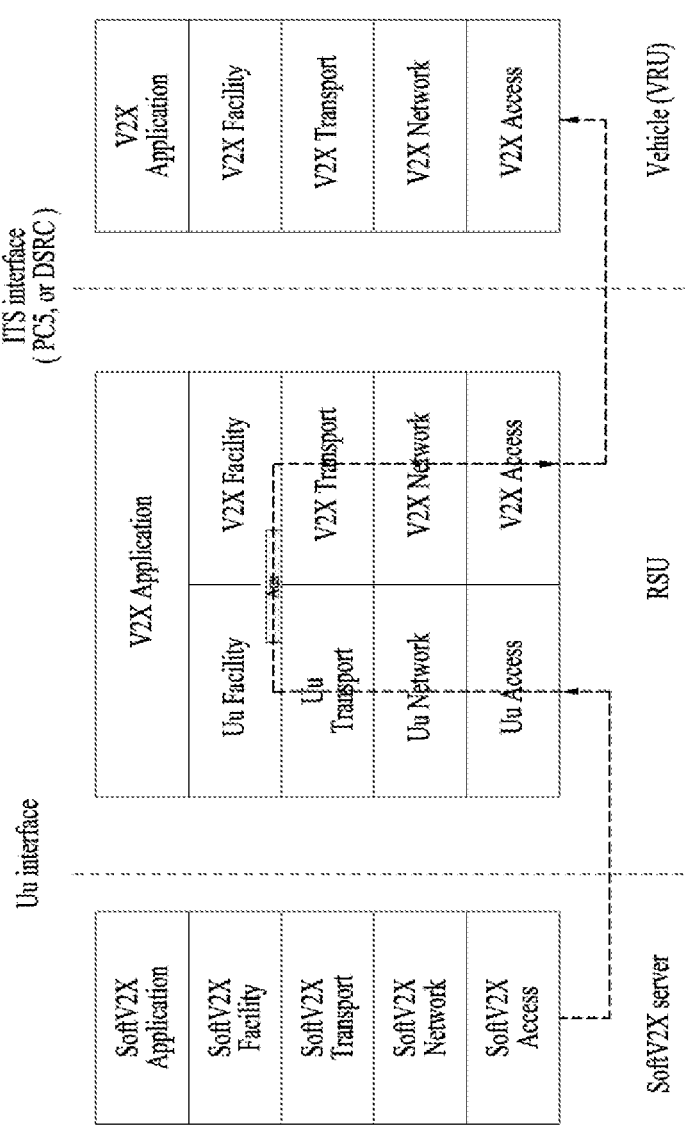
FIG. 13 is a schematic diagram illustrating a communication stack of an RSU that performs conversion of messages between two systems based on an Aux interface.

FIG. 13 is a schematic diagram illustrating a communication stack of the RSU that performs conversion of messages between two systems based on the Aux interface.

Referring to FIG. 13, the RSU may convert a first message (e.g., softV2X message) received from a first interface (e.g., Uu interface) through the Aux block of the facility layer into a second message of a second interface (e.g., PC5 interface), and may transmit or retransmit the second message to peripheral (or neighboring) V2X vehicles.

Specifically, the RSU may receive service information provided by the softV2X system (or V2N system), and may convert the service information into a V2X message and retransmit the V2X message without transferring or analyzing the received service information to the application layer through the Aux block. In this case, the RSU may transmit the V2X message including the service information from the V2X device (or ITS station) or the V2X vehicle, and may provide messages and/or services related to the SoftV2X system to the V2X device (or ITS station) or the V2X vehicle through the V2X interface.

Alternatively, the Aux block of the RSU may be connected to a facility layer related to the Uu interface capable of performing external communication. Meanwhile, although the Aux block is illustrated as being connected to the facility layer of the Uu interface as shown in FIG. 13, the Aux block may also be connected to the facility layer related to the existing wired/wireless interface such as Ethernet.

The application layer of the RSU including the Aux block need not include software corresponding to the SoftV2X system. In addition, when converting the external message into the V2X message or regenerating the external message as the V2X message, the application layer of the RSU including the Aux block need not control a message generation block of the facility layer (alternatively, the application layer of the RSU need not use the message generation block of the facility layer to regenerate messages received from the outside).

Specifically, in general, in order to retransmit the external message received from the first interface as a message of the second interface, the application layer of the RSU should perform data analysis and data extraction of the external message, and should perform operations related to regeneration of the message corresponding to the second interface based on the extracted data. In contrast, the RSU having either the Aux block or the Aux interface can receive the Aux message corresponding to the Aux interface without intervention and control of the application layer, and can easily convert the external message into a V2X message and transmit the V2X message through the Aux interface.

Hereinafter, the Aux function based on either the Aux interface or the Aux block will be described in detail.

Figure 14:
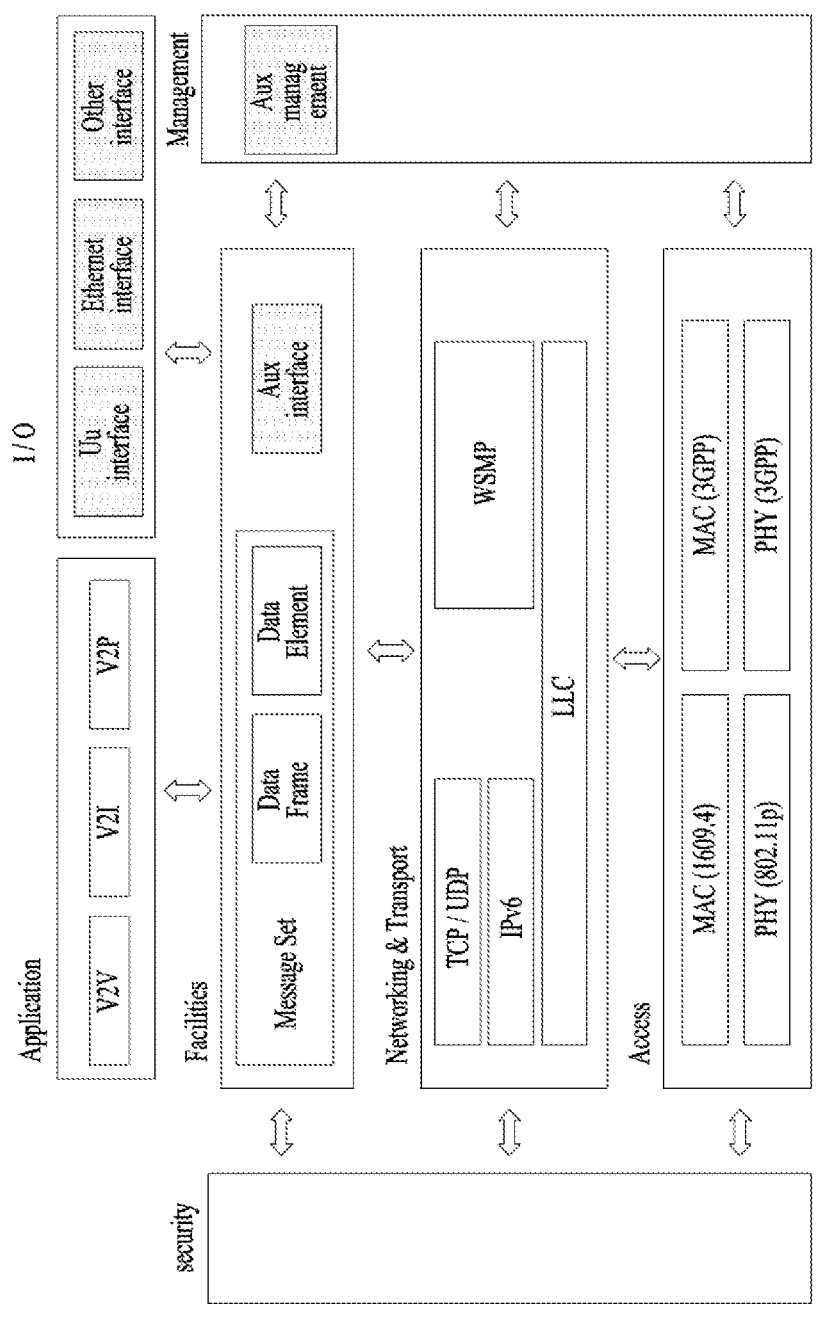
FIG. 14 is a block diagram illustrating a hierarchical structure of the RSU.

FIG. 14 is a block diagram illustrating a hierarchical structure of the RSU.

Referring to FIG. 14, a facility layer may include an Aux interface block, and a management block may include an Aux management block. The RSU may perform an Aux function through the Aux interface block and the Aux management block. In this case, various communication interface blocks may be included as external inputs that can access the Aux interface.

The Aux interface block may be included in the facility layer of the V2X device as shown in FIG. 14. The Aux interface block may be connected to external input interfaces (I/O interfaces). The external input interface may include a Uu interface of LTE, a wired Ethernet interface, and other interfaces capable of operating autonomously.

The general facility layer may generate CAM, DENM, CPM, and VAM messages through data elements and data frames of a message set based on information defined by the application layer. The facility layer may transfer the generated message to the Network and transport (N&T) layer, and the N&T layer may generate a V2X packet based on the transferred message and transmit the V2X packet to the access layer. The access layer may transmit the V2X packet using a V2X interface (DSRC or C-V2X).

The Aux interface (or Aux interface block) may extract a V2X message from the SoftV2X message (or Aux message) received through the external interface, and may transmit the extracted V2X message to the N&T layer. The N&T layer may generate a V2X packet based on the extracted V2X message, and may transmit the generated V2X packet to the access layer (DSRC or C-V2X). The access layer (DSRC or C-V2X) may transmit the V2X message including the V2X packet. That is, the Aux interface may not analyze the information of the received SoftV2X message, and may not generate a message through the message generation block of the facility layer (Alternatively, the Aux interface located in the facility layer may analyze the received SoftV2X information, and may not regenerate/retransmit a message through the existing message generation block in the facility layer).

When the received SoftV2X message is transmitted as a V2X message based on the Aux interface, StationType of the V2X message may be set to a virtual RSU related to SoftV2X rather than RSU. The generation time of the V2X message may be set to a time at which the SoftV2X message is generated in the SoftV2X server.

Similarly to the management block related to the V2X interface, the Aux interface may determine transmission parameters such as a message generation cycle for transmitting an external message (SoftV2X message) received through the Aux interface through the Aux management block as a V2X message, or may collect or measure channel information required for determining the transmission parameters, so that the Aux interface can provide the determined transmission parameters or the collected or measured information to a transmission entity. Here, the management block related to the V2X interface may measure or recognize a state of the V2X channel (or a state of the ITS channel), and may determine transmission parameters related to the V2X message such as a generation period of the V2X message (or a generation period of the ITS message) based on the measured V2X channel state.

That is, the Aux management block may acquire or measure various type of information, for example, channel information (PSCCH, CCH, PSSCH, SCH, resource pool) related to the V2X channel, channel state information (CBR, CR, CSI, etc.), service types related to messages, service priority, etc. The Aux management block may transmit the measured channel information and channel state information to the transmission entity (e.g., SoftV2X server) of the external message.

Figure 15:
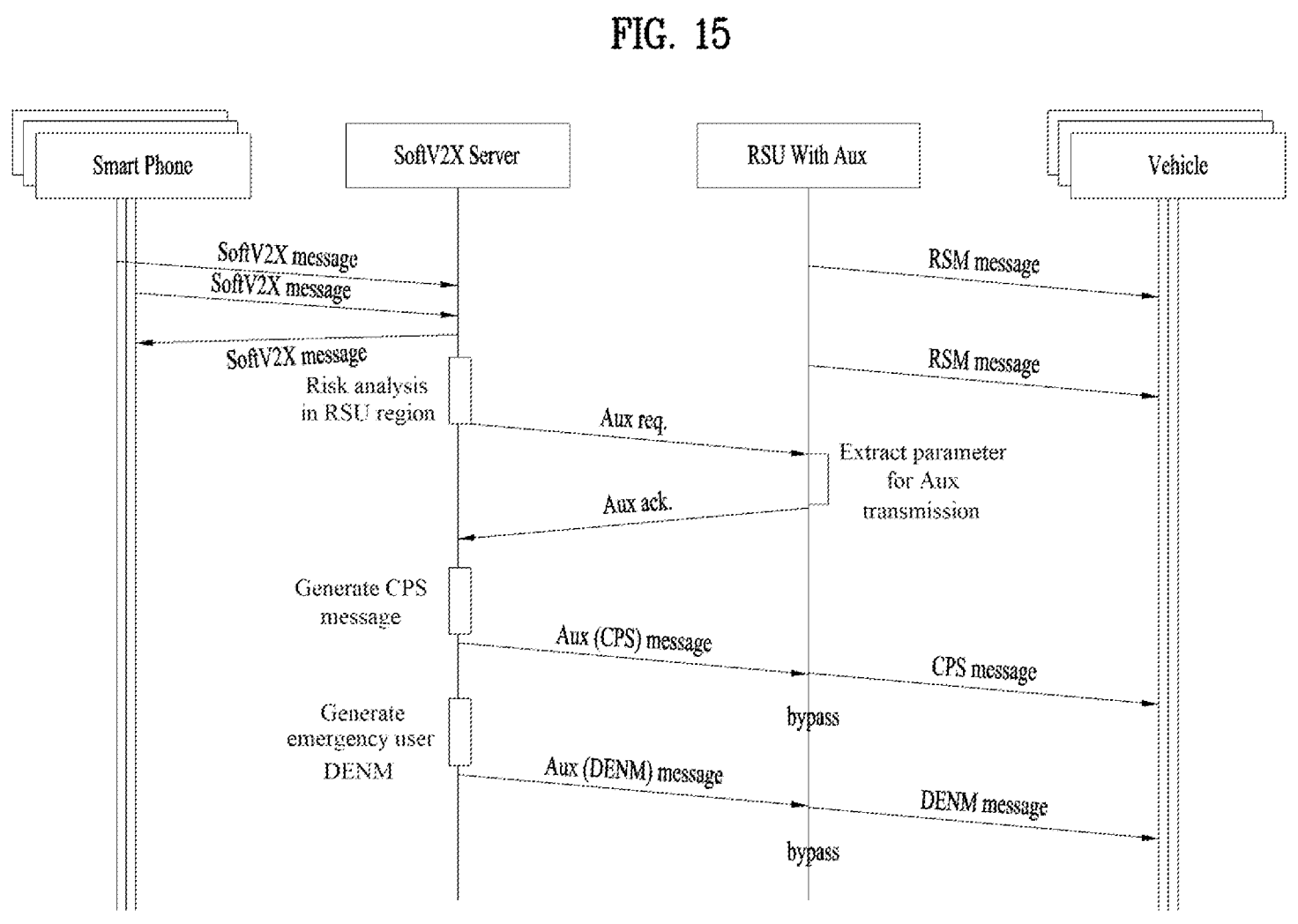
Figure 16:
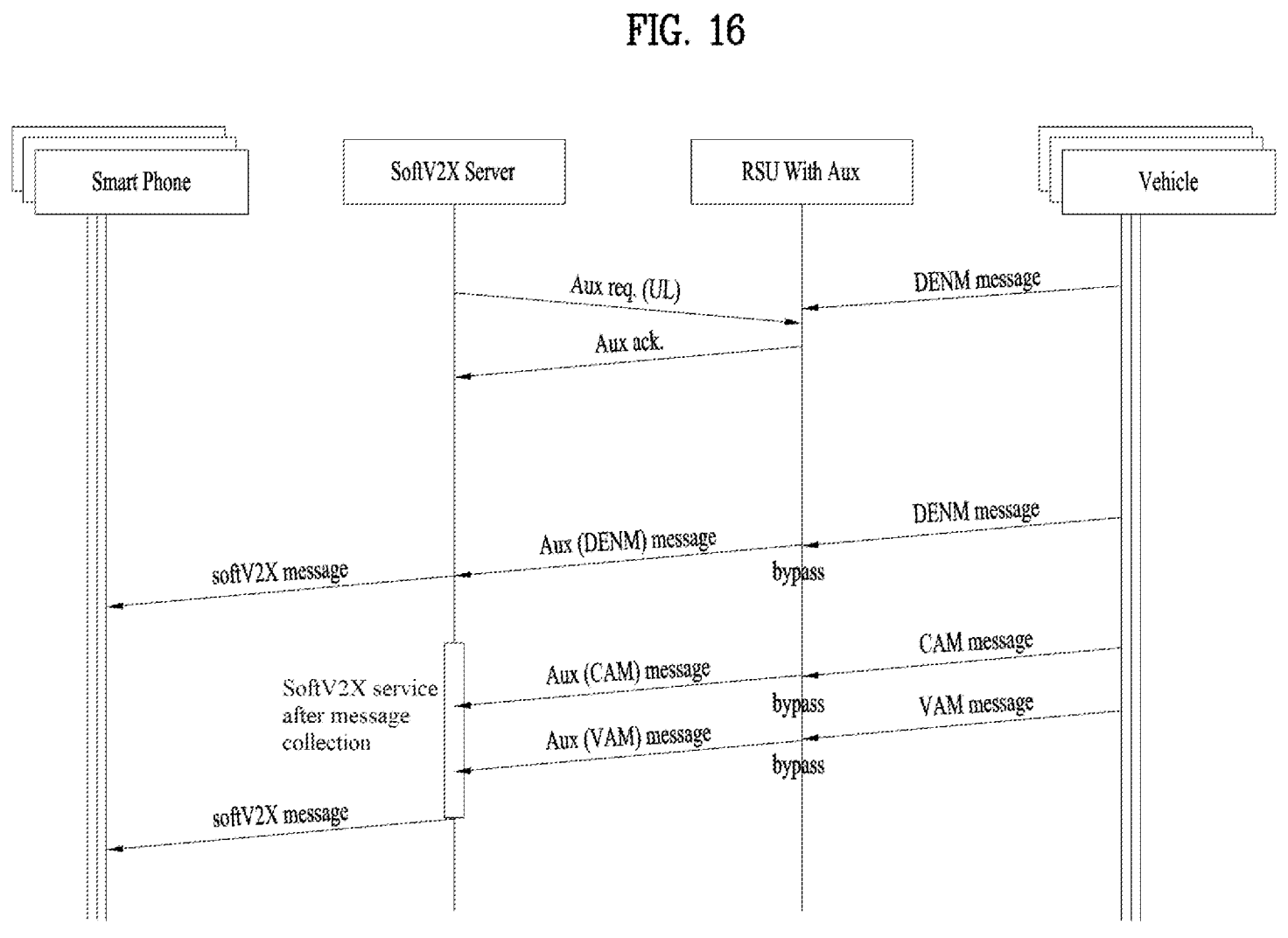

FIGS. 15 and 16 are flowcharts illustrating examples of a method for allowing the RSU to transmit messages using the Aux interface.

SoftV2X may provide its own location and status information to the server through the application (App) installed in the smartphone, and may receive the safety service based on the location and status information. In other words, the user of the smartphone may transmit location and status information to the SoftV2X server through the Uu interface, and may receive SoftV2X-related services (e.g., safety services) from the SoftV2X server. In addition, the RSU may transmit a Road Safety Message (RSM) to the surrounding V2X vehicle or devices (or ITS-stations) using the V2X interface (PC5, DSRC). That is, the safety service provided through the Uu interface may be provided separately and independently from the safety services provided through the V2X interface (or ITS interface), and the RSU cannot share state information related to the safety service with the surrounding V2X vehicles or devices. As described above, the above-described disadvantages can be solved through message retransmission using another interface designed to use the RSU including either the Aux block or the Aux interface.

Referring to FIG. 15, the SoftV2X server may extract or acquire SoftV2X user (e.g., vehicle or VRU) information related to a specific RSU based on a VRU message or a SoftV2X message. The SoftV2X server may generate V2X messages (CAMs, VAMs, CPM) suitable for the region related to the specific RSU based on the extracted SoftV2X user-related information. The SoftV2X server may transmit an Aux request message (Aux req) to the specific RSU in which the Aux interface is supported, so that the SoftV2X server may request (or authenticate) transmission of the V2X message through the specific RSU, or may request (or authenticate) external transmission of the message through the specific RSU. Next, the SoftV2X server may receive an Aux response message in response to the Aux request message from the specific RSU. The Aux response message may include channel information and channel status information (e.g., CBR, channel number, gatekeeper status) obtained from the Aux management block included in the specific RSU.

In this case, the SoftV2X server may analyze information on the surrounding SoftV2X users related to the specific RSU and generate a CPS-type message related to the V2X interface. In addition, the SoftV2X server may encapsulate the message into an Aux message and transmit the encapsulated message to the specific RSU. Thereafter, the RSU may transmit the CPS-type V2X message to the N&T layer by removing the Aux header from the Aux message in the Aux block (or Aux interface) of the facility layer. The N&T layer may generate a V2X packet based on the V2X message, and the generated V2X packet may be transmitted to the surrounding V2X devices (ITS vehicles and/or VRUs) through the access layer. On the other hand, the SoftV2X server may recognize a user who is jaywalking or a user related to a broken-down vehicle based on information about the acquired SoftV2X user. If the above users are recognized, the SoftV2X server may generate a DEMN-type Aux message (or SoftV2X message) related to the users, and may transmit the generated DEMN-type Aux message to the specific RSU. Thereby, the safety of the SoftV2X users can be guaranteed not only in the SoftV2X system but also in the V2X system.

Referring to FIG. 16, the RSU may provide not only a function of retransmitting an external message using the Aux interface, but also a function of transmitting an internal message to the outside using the Aux interface. The SoftV2X server may transmit an Aux request message to collect information of V2X users received from the V2X interface from the RSU. The RSU may transmit an Aux response message in response to the Aux request message, and may transmit V2X messages received from the V2X interface as uplink signals. Specifically, the RSU may receive a V2X message from the surrounding vehicle or V2X devices, and may transmit the received V2X message to the facility layer through the N&T layer. The RSU may retransmit the V2X message transferred to the facility layer to the SoftV2X server through the Aux interface without distinction according to the type of the V2X message.

In this case, the SoftV2X server may decode the Aux message received from the RSU. When the message included in the Aux message is an urgent message such as DENM, the SoftV2X server may immediately transmit the urgent message to the surrounding SoftV2X user, thereby protecting the safety of users related to the DEMN. Alternatively, when the message included in the Aux message is any of other messages such as CAM, CPM, and VAM, the SoftV2X server may collect information about the V2X user from the Aux message, and may provide the collected information about the V2X user to the SoftV2X user. In other words, the SoftV2X server may transmit user (e.g., vehicle, VRU, RSU) information included in a conventional ITS plane to a UE (e.g., smartphone) receiving services of the SoftV2X server.

In this way, the SoftV2X server and the RSU may retransmit messages on different interfaces and/or may exchange information about users of different interfaces. Hereinafter, the structure of the Aux message exchanged between the SoftV2X server and the RSU will be described in detail.

Figure 17:
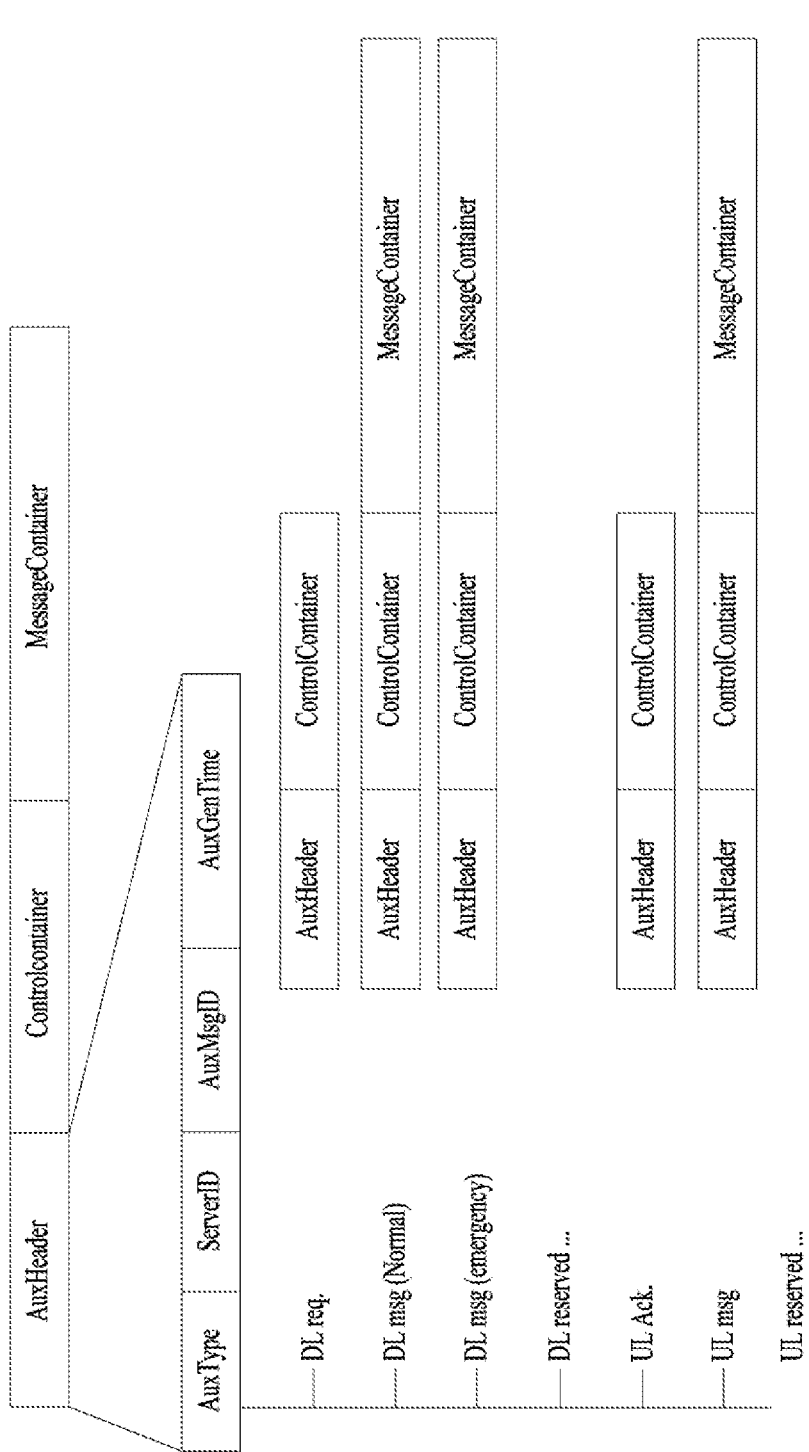
FIG. 17 is a diagram illustrating a structure of an Aux message.

FIG. 17 is a diagram illustrating a structure of the Aux message.

Hereinafter, Aux message types for supporting services through the Aux interface between the SoftV2X server and the RSU are proposed as shown in FIG. 17. The SoftV2X server and the RSU may exchange control information with each other through Aux messages, or the SoftV2X server may transmit and receive conventional V2X messages to and from the RSU.

Referring to FIG. 17, the Aux message may include 'AuxHeader', 'ControlContainer' and 'MessageContainer'.

'AuxHeader' may distinguish Aux messages and may include Aux information.' 'AuxHeader' may include 'Aux-Type' for defining the type of Aux messages, 'ServerID' for identifying an external server, 'AuxID' for identifying the Aux message, and 'AuxGenTime' for indicating the time when the Aux message is generated. 'ControlContianer' is a container that contains control information that supports the Aux message corresponding to 'AuxType'. 'MessageContainer' serving as a container for actually transmitting the V2X message may include the V2X message. In order to perform the bypass operation, the RSU should transmit only the corresponding field without change.

When 'AuxType' is a DL Aux request (DL_req), the DL Aux request message may be transmitted when SoftV2X requests the RSU to bypass the Aux message. The DL Aux request message may include only 'ControlContainer'. When 'AuxType' is a DL message (or DL Aux message), the DL Aux messages can be classified into a message for a general case and a message for an emergency situation, and may include 'AuxHeader', 'ControlContainer', and 'messageContainer' including the V2X message generated by the actual SoftV2X server.

Alternatively, when 'AuxType' is a UL Aux response message (or UL_ack), the RSU having either the Aux capability or the Aux function may transmit the UL Aux response message to the SoftV2X server as an ACK (acknowledgement) signal for the DL Aux request message. The UL Aux response message may include 'AuxHeader' and 'ControlContainer'. When 'AuxType' is a UL Aux message (UL_msg), the UL Aux message is used when the V2X message received by the RSU is transmitted to the SoftV2X server. In addition, the UL Aux message may include 'AuxHeader', 'ControlConater' and 'messageContainer' including the V2X message that was transferred from the surrounding V2X device to the RSU.

In general, a device located at the intermediate location should analyze and identify the SoftV2X messages related to SoftV2X, and should reconvert each of the resultant messages into a V2X message having a type suitable for the opposite direction and should transmit the resultant V2X message.

On the other hand, when the Aux interface that can be connected to the external device is additionally included in the V2X-ITS device, the V2X-ITS device can extract the V2X message by removing only the header from the Aux message received from the outside (for example, since the V2X-ITS device need not perform the operation of analyzing the SoftV2X message and reconstructing the analyzed SoftV2X message as a new type of messages), so that the V2X-ITS device can minimize power consumption due to complex processing and can minimize increase in the complexity of the V2X-ITS device. In addition, since the V2X-ITS device can extract the V2X message by removing only the header from the received Aux message, the V2X-ITS device need not be updated in response to update of the SoftV2X service. As described above, the RSU can efficiently connect the separated SoftV2X (V2N service) region to the ITS-V2X (DSRC, C-V2X PC5) region constructed through direct communication. Although the RSU has been mainly described as a device serving as a relay between the above two services for convenience of description, the scope or spirit of the present disclosure is not limited thereto, and the device scheduled to serve as a relay may include not only the RSU, but also a vehicle (or VRU) that forms an Uu link connected to a V2X communication server.

Figure 18:
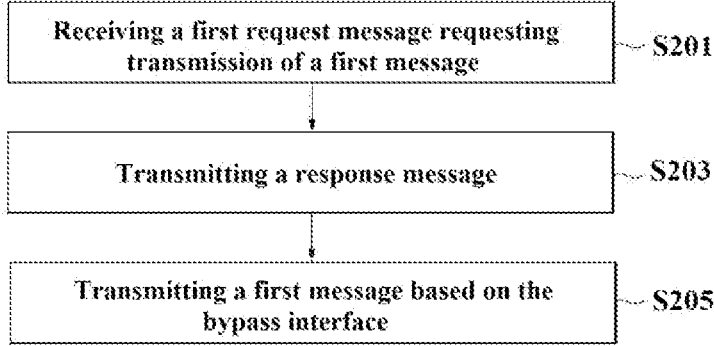
FIG. 18 is a flowchart illustrating a method for allowing the first device to transmit messages based on a bypass interface.

FIG. 18 is a flowchart illustrating a method for allowing a first device to transmit messages based on a bypass interface.

Here, the bypass interface may correspond to the above-described Aux interface or Aux block. In addition, the first device may receive a second message serving as an external message from the network by connecting to a network through a first interface (Uu interface or wired network, etc.), and may transmit a first message, which is a message of the first device, to the surrounding vehicles or surrounding V2X devices through the second interface (DSRC, PC5 interface). Here, the first message may correspond to a V2X message, and the second message may correspond to a SoftV2X message (or Aux message) configured to use the bypass interface.

Referring to FIG. 18, the first device may receive a first request message requesting transmission of the first message based on the bypass interface from the network (S201). The first request message may be a message that requests transmission of the second message transmitted by the network as the first message of the second interface without involvement of the application layer of the first device. Here, the case in which the application layer is not involved may mean a case in which the second message is directly transmitted to the second interface serving as another interface through the bypass interface without being transmitted from the facility layer to the application layer. In other words, when there is no involvement of the application layer, this situation means that not only is the operation in which the application layer extracts data from the external message and analyzes the extracted data to compose the message of the second interface in the facility layer not performed, but also the other operation in which determination of the transmission parameter for the message of the second interface is controlled is not performed.

Next, the first device may transmit a response message that answers or acknowledges the first request message to the network through the first interface (S203). The response message may include channel information and/or channel state information for a channel related to the second interface so that the network may determine at least one transmission parameter related to the second interface. Here, the channel information may include information on the resource pool related to the second interface (and/or information on resources not occupied by the surrounding V2X devices in the resource pool), the type of channels (PSSCH, PSCCH, PSBCH, PSDCH), information about the subchannel index, information about a transmission mode of the sidelink, and characteristic information (e.g., delay requirement, service type, service priority, and service reliability) of the provided service. Here, the channel status information may include a congestion degree (e.g., CBR, CR) of the channel and a quality (e.g., CSI, CQI, etc.) of the channel. Alternatively, the response message may further include configuration information of a transmission parameter related to the second interface. Alternatively, the response message may further include a configuration parameter (e.g., a parameter related to the access layer) related to the first device.

The first device may receive the second message based on the bypass interface through the first interface. The second message based on the bypass interface is a message that can be transmitted as the first message of the second interface without involvement of the application layer according to the bypass interface, and may correspond to the above-described Aux message. For example, the second message may include a message field (or a message field including a message preconfigured with the V2X message of the second interface) including a message preconfigured to correspond to the message configuration of the second interface, and may further include an Aux header and an Aux control field. In this case, the first device may obtain a first message (or V2X message) configured as a message type of the second interface and a transmission parameter related to the first message through the second message, so that the first device can construct a first message according to the control of the application layer. As a result, the first device can transmit a first message through the second interface without determining the transmission parameters for the configured V2X message.

In other words, for the bypass interface, the first device may receive a V2X message configured in a format corresponding to the second interface and the second message including a predetermined transmission parameter related to the V2X message. In this case, the first device may transmit the first message through the second interface according to the V2X message and transmission parameters included in the second message. That is, the bypass interface may be an interface for transmitting the first message of the second interface related to the second message according to at least one transmission parameter and message configuration included in the second message received through the first interface.

Alternatively, the first device may extract the V2X message from the message field of the second message, and may transmit the V2X message as the first message according to at least one transmission parameter included in the Aux control field. That is, in order to immediately transmit the first message through the second interface without involvement of the application of the first device, the second message may include a V2X message configured to correspond to the second interface, and information about the transmission parameter of the second interface related to the V2X message.

Next, the first device may transmit or retransmit the second message received through the first interface as the first message of the second interface using the bypass interface (S205). As described above, the first device may extract the V2X message included in the second message (or may remove the first header or the Aux header), and may transmit the extracted V2X message as the first message according to the transmission parameters included in the second message. That is, the first device may retransmit the first message according to a V2X message (or the first message) included in the second message and transmission parameters of the V2X message without performing analysis of the second message and data extraction from the second message.

Alternatively, the first device may determine the type of the first message based on type information included in a first header defined for a bypass interface within the second message. For example, the first header may include information for indicating at least one of a cooperative awareness message (CAM), a vulnerable road user awareness message (VAM), a collective perception message (CPM), a decentralized environmental notification message (DENM), a basic safety message (BSM), a pedestrian safety message (PSM), a maneuver coordination message (MCM), a road safety message RSM), a Signal Phase & Timing Message (SPAT), and map data (MAP). The first device may determine the type of the first message to be transmitted in relation to the second message based on type information indicated by the first header.

Alternatively, the first device may transmit the first message by determining the generation time of the first message as the generation time of the second message. In this case, the first device serving as a virtual first device in the first interface may provide information about the transmission entity of the first message.

Meanwhile, the first device may determine whether to transmit the second message using the bypass interface based on whether the first header defined for the bypass interface is included in the second message. When the first header is included in the second message, the first device may extract a V2X message preconfigured for the second interface by removing the first header from the second message, and may transmit the extracted V2X message as the first message according to at least one transmission parameter included in the second message.

In contrast, when the first header related to the bypass interface is not included in the second message, the application layer of the first device may extract and analyze data from the second message, and may determine whether to include the analyzed data as some data of the message thereof. In this case, the first device may consider the second message to be external information according to a simple external message without retransmitting the second message to the first message according to the bypass interface.

Alternatively, the first device may receive a second request message from the network. The second request message may be a message for requesting transmission of third messages (i.e., V2X messages received from the surrounding V2X devices in relation to the second interface) received from the second interface to the network through the bypass interface. The first device may transmit an acknowledgment (ACK) message in response to the second request message to the network. The first device may directly retransmit the third messages received from the second interface as a fourth message of the first interface to the network without involvement of the application layer.

Meanwhile, the first message may be transmitted as a sidelink signal.

Figure 19:
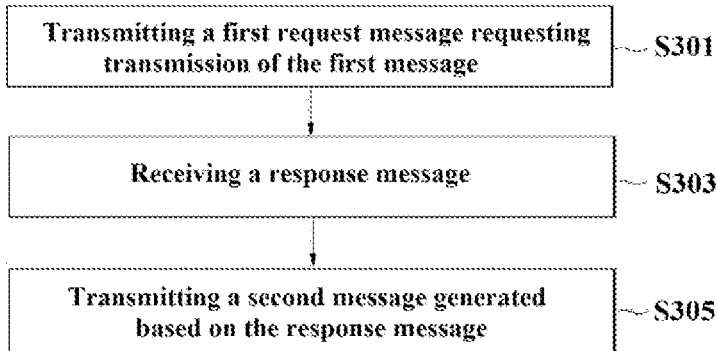
FIG. 19 is a flowchart illustrating a method for allowing a network to request transmission of a first message from the first device having a bypass interface.

FIG. 19 is a flowchart illustrating a method for allowing the network to request transmission of a first message from the first device having a bypass interface.

Referring to FIG. 19, the network may transmit a first request message requesting transmission of a first message based on the bypass interface to the first device (S301). The first request message may be a message for requesting transmission of the second message transmitted by the network as the first message of the second interface without involvement of the application layer of the first device. Alternatively, the first request message may be a message for requesting retransmission or bypass transmission of the message of the network as a message of the second interface.

Next, the network may receive a response message that answers or acknowledges the first request message through the first interface (S303). The response message may include channel information and/or channel state information for a channel related to the second interface that is a basis for determining at least one transmission parameter related to the second interface.

The network may directly determine a transmission parameter related to the second interface based on channel information and/or channel state information included in the response message. For example, the network may determine a transmission parameter corresponding to the channel information and/or channel state information included in the response message based on configuration information related to the determination of the transmission parameter of the second interface, and the determined at least one transmission parameter may be included in the second message. Here, the determined at least one transmission parameter may be at least one transmission parameter required when the second message is transmitted as the first message by the bypass interface in the first device.

Alternatively, the response message including the channel state information and/or channel information may be periodically received from the first device. That is, the network may periodically determine transmission parameters related to the second interface based on the periodically received response message. Alternatively, the response message may be received whenever status information of the channel related to the second interface is changed.

Next, the network may transmit the second message to be retransmitted by the first device to the first device through the bypass interface to the first device through the first interface (S305). The second message is a message formed in a format capable of being transmitted as a first message of the second interface without involvement of the application layer according to the bypass interface, and may correspond to the above-described Aux message.

For example, the second message may include a preconfigured V2X message (or a message field including the V2X message) corresponding to the second interface, an Aux header, and an Aux control field. In this case, in order to use the bypass interface, the network may allow the second message to additionally include not only a V2X message preconfigured based on the second interface, but also information about at least one predetermined transmission parameter related to the V2X message. In this case, the first device may extract the preconfigured V2X message, and may transmit the V2X message as the first message according to the at least one transmission parameter.

In other words, in order to use the bypass interface, the network may transmit not only a V2X message configured in a format corresponding to the second interface, but also the second message including a predetermined transmission parameter in relation to the V2X message. In this case, the first device may extract a preconfigured V2X message from the second message, and may transmit the extracted V2X message as the first message according to a transmission parameter included in the second message.

Alternatively, the network may transmit the second message further including type information included in the first header defined for the bypass interface. In this case, the first device may determine the type of the first message corresponding to the second message based on the type information. For example, the type information may include information indicating one message type from among CAM (Cooperative Awareness Message), VAM (Vulnerable road user Awareness Message), CPM (Collective Perception Message) and DENM (Decentralized Environmental Notification Message), which are message types related to the second interface. The first device may determine the type of the first message to be transmitted in relation to the second message based on type information indicated by the first header.

Alternatively, the network may transmit a second request message to the first device. The second request message may be a message for requesting transmission of third messages (i.e., V2X messages received from the surrounding V2X devices in relation to the second interface) received from the second interface in the first device to the network through the bypass interface. In this case, the network may receive an acknowledgment (ACK) message in response to the second request message from the first device. The first device may directly retransmit the third messages received from the second interface as a fourth message of the first interface to the network without involvement of the application layer. Thereafter, the network may receive, from the first device, a fourth message including the V2X messages of the surrounding vehicles. Here, the V2X messages of the surrounding vehicles are received by the first device through the second interface.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 20:
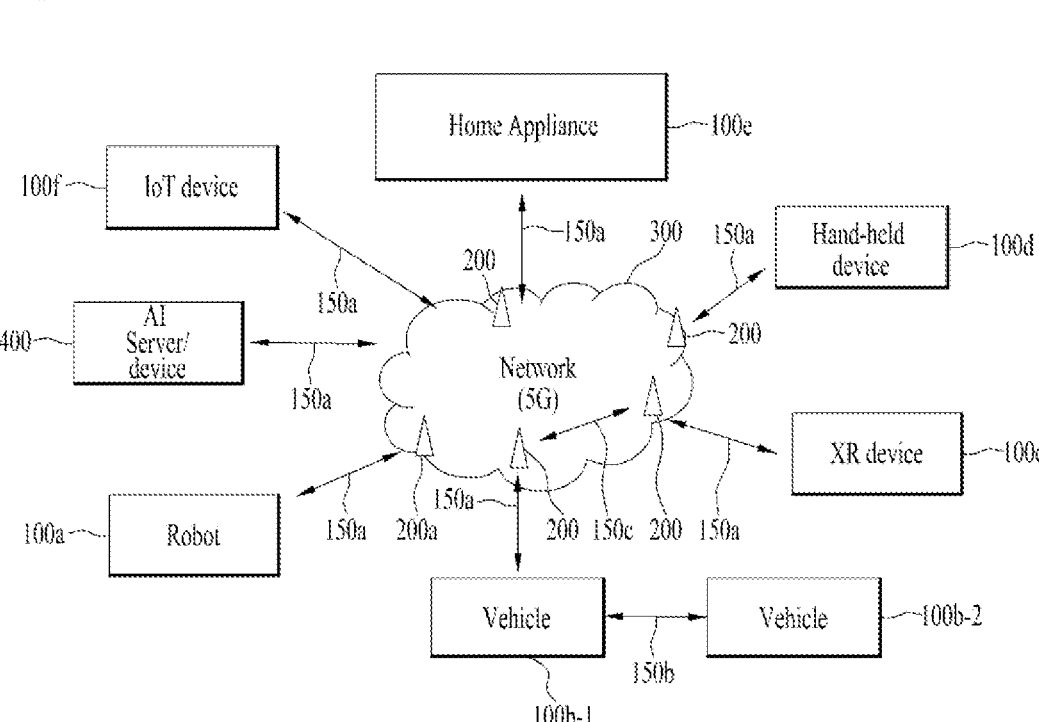
FIG. 20 illustrates a communication system applied to the present disclosure.

FIG. 20 illustrates a communication system applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 21:
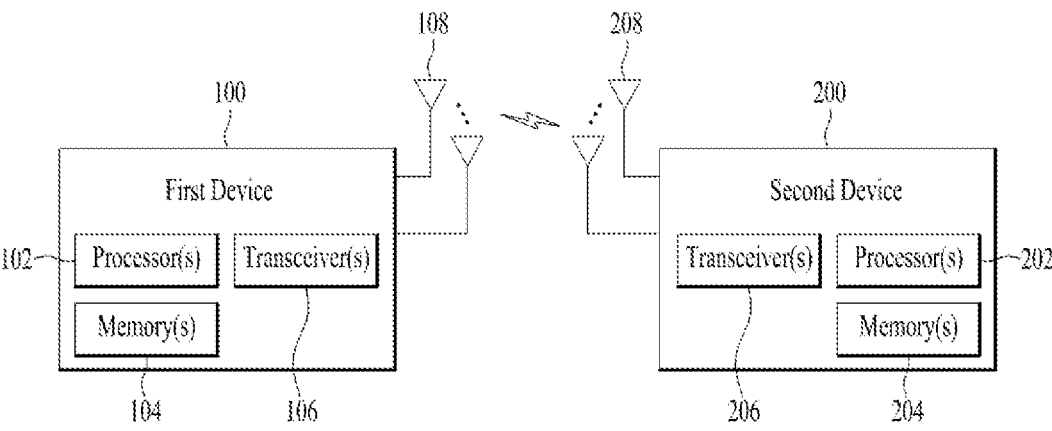
FIG. 21 illustrates wireless devices applicable to the present disclosure.

FIG. 21 illustrates a wireless device applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the first wireless device 100 may be a first device or an RSU having a V2X communication module. The first wireless device 100 may include a processor 102 and a memory 104 connected to the RF transceiver. The memory 104 may include at least one program capable of performing operations related to the embodiments described with reference to FIGS. 11 to 19.

The processor 102 may control the RF transceiver to receive a first request message requesting transmission of the first message based on a bypass interface, may transmit a response message for acknowledging transmission of the first message, and may transmit the second message received from the network as the first message based on the bypass interface. The bypass interface may be an interface for transmitting the second message received through the first interface as the first message through the second interface without involvement of the application layer of the first device. The response message may include channel information related to the second interface. The processor 102 may perform operations of transmitting the first message through the bypass interface described with reference to FIGS. 11 to 19 based on a program included in the memory 104.

Alternatively, the processor 102 and the memory 104 may be included in a chipset for transmitting the first message in a wireless communication system supporting sidelink. The chipset may include at least one processor and at least one memory operatively connected to the at least one processor and configured to, when executed, cause the at least one processor to perform an operation.

At least one processor included in the chipset may receive a first request message requesting transmission of the first message based on a bypass interface, may transmit a response message for acknowledging transmission of the first message, and may transmit the second message received from the network as the first message based on the bypass interface. The bypass interface may be an interface for transmitting the second message received through the first interface as the first message through the second interface without involvement of the application layer of the first device. The response message may include channel information related to the second interface. The processor 102 may perform operations of transmitting the first message through the bypass interface described with reference to FIGS. 11 to 19 based on a program included in the memory 104.

Alternatively, a computer-readable storage medium is configured to store at least one computer program used when a first message is transmitted in a wireless communication system supporting sidelink. The computer-readable storage medium may include at least one computer program for allowing the at least one processor to perform specific operations of transmitting the first message, and a computer-readable storage medium in which the at least one computer program is stored. The specific operation may receive a first request message requesting transmission of the first message based on a bypass interface, may transmit a response message for acknowledging transmission of the first message, and may transmit the second message received from the network as the first message based on the bypass interface. The bypass interface may be an interface for transmitting the second message received through the first interface as the first message through the second interface without involvement of the application layer of the first device related to the computer-readable storage medium. The response message may include channel information related to the second interface.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Specifically, the second wireless device 200 may be a base station (BS) or a SoftV2X server. The second wireless device may include a processor 202 and a memory 204 connected to the RF transceiver. The memory 204 may include at least one program capable of performing operations related to the embodiments described with reference to FIGS. 11 to 17.

The processor 202 controls the RF transceiver to transmit a request message requesting transmission of the first message based on the bypass interface to the first device (or the first wireless device) through the first interface, may receive a response message including channel information related to a second interface, and may transmit a second message generated in response to the bypass interface to the first device through the first interface. Here, the second message may include a message that is comprised of not only at least one transmission parameter for the second interface determined based on the channel information corresponding to the bypass interface, but also a message type of the second interface.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

FIG. 22 illustrates another example of a wireless device applied to the present disclosure. The wireless device may be implemented in various forms according to a use-case/service (refer to FIG. 20)

Referring to FIG. 22, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 20), the vehicles (100*b*-1 and 100*b*-2 of FIG. 20), the XR device (100*c* of FIG. 20), the hand-held device (100*d* of FIG. 20), the home appliance (100*e* of FIG. 20), the IoT device (100*f* of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 23:
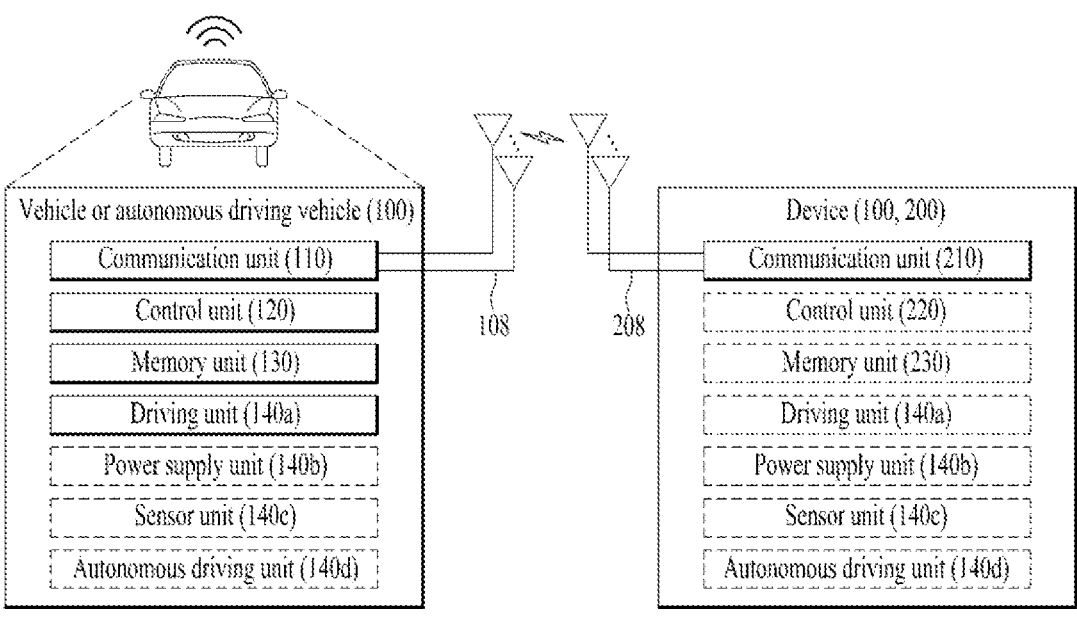
FIG. 23 illustrates a vehicle or an autonomous driving vehicle applied to the present disclosure.

Examples of Vehicles or Autonomous Vehicles to which the Present Disclosure is Applied FIG. 23 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 23, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

US 12,627,953 B2

37

INDUSTRIAL APPLICABILITY

The above-described embodiments of the present disclosure are applicable to various mobile communication systems.

The invention claimed is:

1. A method performed by a first device, the method comprising:

receiving, through a first interface, a request message for requesting a transmission of a message based on a bypass interface;

transmitting, through the first interface, a response message including first information related to a second interface based on the request message;

receiving, through the first interface, a second message including a control field related to the bypass interface and a V2X (vehicle to everything) message from a network based on the bypass interface; and transmitting a first message including the V2X message to neighboring devices through the second interface based on the bypass interface, wherein the first information includes information on resources that are sensed as not being occupied by other devices within a resource pool for the second interface, and a channel busy ratio (CBR) for the second interface, wherein the control field includes transmission parameters for the second interface that are determined by the network based on the resources and the CBR, and wherein the first message is transmitted, without being processed by an application layer of the first device, using only the transmission parameters.

2. The method according to claim 1, wherein the first information further includes a subchannel index for a channel related to the second interface, channel quality information, service information, and a configuration parameter related to the first device.

3. The method according to claim 1, wherein the second message includes the first message preconfigured as a message type of the second interface.

4. The method according to claim 1, wherein the second message is converted into the first message by removing the control field and a first header related to the bypass interface by the bypass interface.

5. The method according to claim 4, wherein the first message is transmitted as a message type of any one of a cooperative awareness message (CAM), a vulnerable road user awareness message (VAM), a collective perception message (CPM), a decentralized environmental notification message (DENM), a basic safety message (BSM), a pedestrian safety message (PSM), a maneuver coordination message (MCM), a road safety message (RSM), a signal phase & timing message (SPAT), and a map data (MAP), which are associated with the second interface based on type information included in the first header.

6. The method according to claim 1, wherein the first message includes information for a generation time corresponding to a generation time of the second message in the network.

7. The method according to claim 1, wherein the first interface is an interface for wired or wireless communication with the network; and wherein the second interface is a PC5 interface or a direct communication interface related to dedicated short-range communication (DSRC).

38

8. A first device comprising:

a radio frequency (RF) transceiver; and a processor connected to the RF transceiver, wherein the processor is configured to:

receive, through a first interface, a request message for requesting a transmission of a message based on a bypass interface, under control of the RF transceiver;

transmit, through the first interface, a response message including first information related to a second interface based on the request message;

receiving, through the first interface, a second message including a control field related to the bypass interface and a V2X (vehicle to everything) message from a network using the bypass interface; and transmit a first message including the V2X message to neighboring devices through the second interface based on the bypass interface, wherein the first information includes information on resources that are sensed as not being occupied by other devices within a resource pool for the second interface, and a channel busy ratio (CBR) for the second interface, wherein the control field includes transmission parameters for the second interface that are determined by the network based on the resources and the CBR, and wherein the V2X message is transmitted, without being processed by an application layer of the first device, using only the transmission parameters.

9. A non-transitory computer-readable storage medium configured to store at least one computer program including instructions used to transmit a first message in a wireless communication system supporting sidelink, the computer-readable storage medium comprising:

at least one computer program for at least one processor to perform specific operations of transmitting the first message by a first device; and a computer-readable storage medium configured to store the at least one computer program, wherein the specific operations include:

receiving, through a first interface, a request message for requesting a transmission of a message based on a bypass interface;

transmitting, through the first interface, a response message including first information related to a second interface based on the request message;

receiving, through the first interface, a second message including a control field related to the bypass interface and a V2X (vehicle to everything) message from a network using the bypass interface; and transmitting a first message including the V2X message to neighboring devices through the second interface based on the bypass interface, wherein the first information includes information on resources that are sensed as not being occupied by other devices within a resource pool for the second interface, and a channel busy ratio (CBR) for the second interface, wherein the control field includes transmission parameters for the second interface that are determined by the network based on the resources and the CBR, and wherein the first message is transmitted, without being processed by an application layer of the first device, using only the transmission parameters obtained from the second message.

* * * * *